US011635515B1

(12) United States Patent
Nagareda et al.

(10) Patent No.: US 11,635,515 B1
(45) Date of Patent: Apr. 25, 2023

(54) FLASHER TYPE MULTI-FREQUENCY FISH FINDER

(71) Applicant: HONDA ELECTRONICS CO., LTD., Aichi (JP)

(72) Inventors: Kenji Nagareda, Aichi (JP); Shuichi Sano, Aichi (JP); Kazuki Higuchi, Aichi (JP)

(73) Assignee: HONDA ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 17/706,742

(22) Filed: Mar. 29, 2022

(51) Int. Cl.
*G01S 15/96* (2006.01)
*G01S 7/52* (2006.01)
*G08B 5/38* (2006.01)

(52) U.S. Cl.
CPC ......... *G01S 15/96* (2013.01); *G01S 7/52076* (2013.01); *G08B 5/38* (2013.01)

(58) Field of Classification Search
CPC ........ G01S 15/96; G01S 7/52076; G08B 5/38
See application file for complete search history.

(56) References Cited

U.S. PATENT DOCUMENTS

| | | | |
|---|---|---|---|
| 4,064,478 A * | 12/1977 | Honda | G01S 15/96 367/111 |
| 5,973,997 A | 10/1999 | Yamamoto et al. | |
| 5,999,490 A | 12/1999 | Shimauchi et al. | |
| 8,553,500 B1 | 10/2013 | Sano et al. | |
| 9,250,325 B2 | 2/2016 | Sano et al. | |
| 10,816,662 B2 | 10/2020 | Kokubo | |
| 2018/0088233 A1 | 3/2018 | Sano | |
| 2020/0018850 A1 | 1/2020 | Kokubo | |

* cited by examiner

Primary Examiner — Daniel Pihulic

(74) Attorney, Agent, or Firm — Clark & Brody LP

(57) ABSTRACT

The flasher-type multi-frequency fish finder includes a wideband ultrasonic transducer, a display-rotating disk, a motor and a control device. The plurality of display LEDs are composed of the first, second and third display LEDs. The control device has a signal-separating and obtaining part and a light-emission signal-producing part. The signal-separating and obtaining part separates the reflected signal and obtains the first reflected signal corresponding to the high frequency, the second reflected signal corresponding to the medium frequency, and the third reflected signal corresponding to the low frequency. The light-emission signal-producing part generates first, second and third light-emission signals based on the first, second and third reflection signals, respectively. The first, second and third annular-display regions are concentrically set on the display surface. Underwater detection results by high frequency, medium frequency and low frequency ultrasonic waves are simultaneously indicated by a flashing light in the first, second and third annular-display regions.

6 Claims, 19 Drawing Sheets

FLASHER TYPE MULTI-FREQUENCY FISH FINDER

BACKGROUND OF THE INVENTION

Field of the Invention

The present invention relates to a flasher-type multi-frequency fish finder. More particularly the present invention is a flasher-type multi-frequency fish finder having a flasher display capable of indicating underwater-detection results simultaneously using three different frequencies.

Description of the Related Art

A flasher-type fish finder having a display-rotating disk to which an LED (Light Emitting Diode) is fixed to display an underwater-detection result by rotating the display-rotating disk is conventionally known. This flasher-type fish finder causes the LED to emit light at the time when the LED comes to a position showing the underwater depth in a display window provided opposite the display-rotating disk. As such, this fish finder displays the results of underwater detection. The inventors of the present invention have invented a flasher-type fish finder in the past. Such a flasher-type fish finder is disclosed for example in publications such as U. S. Patent Application Nos. 202010018850, 2018/0088233, U.S. Pat. Nos. 5,999,490, 9,250,325, 8,553, 500, 10,816,662, 5,973,997 or the like.

These flasher-type fish finders basically comprise an ultrasonic transducer, a display-rotating disk, a motor, and the like. The ultrasonic transducer transmits ultrasonic waves into water and receives reflected signals from that water. A display-rotating disk is fixed opposite a display window to the end of a rotary shaft of a motor on the front-case side. With this configuration, the display-rotating disk is rotated with the motor. A display LED, to emit light based on reflected signals showing a search result in water, is fixed on the display-rotating disk opposite the display window of the front case. The display LED emits light in the display window when the display-rotating disk rotates at a high speed and when the display LED comes to a position indicating a water surface; a position indicating a fish school; and a position indicating the reflection of a bottom echo. With this configuration, the flasher-type fish finder allows the user to recognize the underwater-detection results.

Incidentally, the ultrasonic transducer of such a flasher-type fish finder is immersed in water through a hole made in the ice on a lake. At that time, the ultrasonic transducer is installed so as to radiate ultrasonic waves perpendicularly downward. A fishing device on a fishing line is dangled from the hole made in the ice. In this state, such a device itself and the depth of the fish school are detected. The ultrasonic waves emitted by the ultrasonic transducer have straight-running stability. The ultrasonic beam spreads in a conical shape in a directional angle from the center. The range in which this beam spreads is the detection range. Therefore, a school of fish located outside this detection range cannot be detected. The directional angle of ultrasonic waves is determined by the sound-source size and frequency of the transducer. The directional angle of ultrasonic waves becomes narrower as the frequency increases and becomes wider as the frequency decreases. Therefore, for example, FIG. 9 of U.S. Pat. No. 5,999,490 discloses a flasher-type fish finder having two frequencies of ultrasonic waves to be transmitted: a high frequency and a low frequency (that is, two directional angles). According to this fish finder, the detection results in water by two frequencies are simultaneously indicated in half a circle each on the display-rotating disk (see FIG. 10 of U.S. Pat. No. 5,999,490). Specifically, the high-frequency reflected signal with a narrow directional angle is indicated in the right-half region of the display-rotating disk while a low-frequency reflected signal with a wide directional angle is indicated in the left-half region of the display-rotating disk.

However, with this flasher-type fish finder, it is impossible to indicate simultaneously the detection results in water using three frequencies. In addition, it is impossible to indicate simultaneously the detection results of water using three frequencies in a manner that is intuitively easy for the user to understand. Further, to obtain the detection result in water using three frequencies, an ultrasonic transducer is required for each frequency. Not only that but a transmission circuit, a reception circuit, an A/D converter, a buffer memory, etc. are also required for each frequency. Therefore, it is probable that the configuration of such a device will be complex, and that the size would be greater, thus incurring a higher cost.

BRIEF SUMMARY OF THE INVENTION

The present invention has been made to solve the above-mentioned problems. The aim is to provide a flasher-type multi-frequency fish finder that makes it possible to indicate simultaneously, by a flashing light, underwater-detection results using three frequencies in an easier manner for a user to understand intuitively while avoiding a complex configuration, a large size, and a high cost of the device.

To achieve the above object, the first aspect of this invention refers to a flasher-type multi-frequency fish finder comprising: a wideband ultrasonic transducer that transmits ultrasonic waves into water and receives reflected signals from that water; a display-rotating disk having a plurality of display LEDs on the display surface; a motor that rotates the display rotating disk; and a control device that produces a light-emission signal to cause the display LED to emit light based on a reflected signal.

The plurality of display LEDs are arranged along the radial direction on the display surface, which include a first-display LED, a second-display LED and a third-display LED.

The control device includes: a signal separating and obtaining part that separates a reflected signal into three or more types of frequency components including a first-frequency component, a second-frequency component and a third-frequency component, and obtains a first-reflected signal corresponding to the first-frequency component, a second-reflected signal corresponding to the second-frequency component and a third-reflected signal corresponding to the third-frequency component; and a light emission signal producing part that produces a first-light emission signal based on the first reflected signal, a second-light emission signal based on the second reflected signal, and a third-light emission signal based on the third reflected signal.

The light emission signal producing part produces the first light emission signal that causes the first-display LED to emit light; produces the second light emission signal that causes the second-display LED to emit light; and produces the third light emission signal that causes the third-display LED to emit light. The first, second and third annular-display regions are concentrically set on the display surface. At the same time, the underwater-detection results obtained by using three different ultrasonic frequencies are simultaneously indicated by a flashing light on the first, second and third annular-display regions.

As such, according to the first aspect of this invention, the first, second and third annular-display regions are set concentrically on the display surface, thus making it possible to indicate by a flashing light the underwater-detection results obtained by using three different frequencies in an easier manner for the user to understand intuitively. Also, the signal separating and obtaining part separates the reflected signal received by the wideband-ultrasonic transducer into three or more types of frequency components and then obtains the first, second and third reflected signals. Further, the light emission signal producing part produces the first, second and third light emission signals based on each reflected signal. Therefore, an ultrasonic transducer and a transmission/reception circuit for each frequency are not required, thus making it possible to avoid a complex configuration, a large size, and a high cost of the device.

Here, the first-display LED may be arranged on the inner-peripheral side of the display-rotating disk and may emit light in the first annular-display region so as to indicate the result of the first reflected signal corresponding to the frequency component on the high-frequency side among the reflected signals separated into three or more types of frequency components. The second-display LED may be arranged on the outer-peripheral side of the first-display LED and may emit light in the second annular-display region surrounding the first annular-display region so as to indicate the result of the second reflected signal corresponding to the medium-frequency component among the reflected signals separated into three or more types of frequency components. The third-display LED may be arranged on the outer-peripheral side of the second-display LED and may emit light in the third annular-display region surrounding the second annular-display region so as to indicate the result of the third reflected signal corresponding to the frequency component on the low-frequency side among the reflected signals separated into three or more types of frequency components.

With the above configuration, the underwater-detection result corresponding to the high frequency with a narrow directional angle is indicated on the innermost side of the display. In addition, the underwater-detection result corresponding to the low frequency with a wide directional angle is indicated on the outermost-peripheral side. Then, the underwater-detection result corresponding to the medium frequency with a medium-directional angle is indicated between the innermost and outermost peripheral sides. As a result, the underwater-detection result obtained by using three different frequencies can be indicated in an easier way to understand instinctively.

The light-emission signal producing part may perform luminance modulation so as to replace the intensities of the first, second and third reflected signals with luminance. Alternatively, the light-emission signal producing part may perform a color modulation so as to replace the intensities of the first, second and third reflected signals with chromatic colors.

With the above configuration, the user can accurately grasp the intensity of the reflected signal of each frequency (that is, the scale of the fish schools) according to the intensity of the luminance.

To achieve the above object, the second aspect of the present invention refers to a flasher-type multi-frequency fish finder comprising: a wideband ultrasonic transducer that transmits ultrasonic waves into water and receives reflected signals from that water; a display-rotating disk having a plurality of display LEDs on the display surface; a motor for rotating the display-rotating disk; and a control device for producing a light emission signal to cause the display LED to emit light based on the reflected signals.

The control device comprises: a signal separating and obtaining part that separates a reflected signal into three or more types of frequency components including a first-frequency component, a second-frequency component and a third-frequency component, and obtains a first-reflected signal corresponding to the first-frequency component, a second-reflected signal corresponding to the second-frequency component and a third-reflected signal corresponding to the third-frequency component; and a light emission signal producing part that produces a first-light emission signal based on the first reflected signal, a second-light emission signal based on the second reflected signal and a third-light emission signal based on the third reflected signal.

The emission-signal-producing part performs luminance modulation of the first reflected signal to replace its intensity with the luminance, thus producing the first emission signal that causes the display LED to emit light in the first chromatic color; performs luminance modulation of the second reflected signal to replace its intensity with the luminance, thus producing the second emission signal that causes the display LED to emit light in the second chromatic color different from the first chromatic color; and performs luminance modulation of the third reflected signal to replace its intensity with the luminance, thus producing the third emission signal that causes the display LED to emit light in a third chromatic color different from the first and second chromatic colors.

An annular display region is set on the display surface, and underwater detection results, obtained by using three different types of ultrasonic frequencies, are flashingly indicated in the annular display region at the same time.

As such, according to the second aspect of the present invention, underwater-detection results obtained by using high frequency, medium frequency and low frequency ultrasonic waves is indicated in different chromatic colors in the annular-display region set on the display surface. Also, the light emission-signal producing part performs the luminance modulation of the first, second, and third reflected signals, respectively to replace their intensities with luminance. By this process, the intensity of the reflected signal of each frequency (that is, the scale of the schools of fish) is shown by the intensity of the luminance, thus making it possible to show by a flashing light the underwater-detection results obtained by using three different frequencies in an easy way to understand instinctively. Further, the signal separating and obtaining part separates the reflected signal received by the wideband ultrasonic transducer into three or more types of frequency components and obtains the first, second and third reflected signals. Furthermore, the light emission signal producing part produces the first, second and third light emission signals based on each reflected signal. Therefore, the ultrasonic transducer and transmission/reception circuit for each frequency are not required, thus making it possible to avoid a complex configuration, a large size, and a high cost of the device.

Here, when the light-emission timings of the display LEDs by the first, second and third emission signals overlap each other, the light emission based on the result of the frequency component on the higher-frequency side may be prioritized.

With the above configuration, when the light-emission timings overlap, the underwater-detection result by the higher frequency (that is, the underwater-detection result by the ultrasonic beam with the narrower band) is preferentially indicated.

BRIEF DESCRIPTION OF THE DRAWINGS

FIG. 7 (b) is the schematic illustration of the school of fish while being indicated in the state of the flasher display as shown in FIG. 7 (a).

FIG. 8 (b) is the schematic illustration of the school of fish while being indicated in the state of the flasher display as shown in FIG. 8 (a).

FIG. 9 (b) is the diagram showing the state of the flasher display of the flasher-type multi-frequency fish finder as the second modification according to the first embodiment.

FIG. 9 (c) is the schematic illustration of the school of fish while being indicated in the state of the flasher display as shown in FIG. 9 (a) and FIG. 9 (b).

FIG. 10 (b) is the schematic illustration of the school of fish while being indicated in the state of the flasher display as shown in FIG. 10 (a).

FIG. 11 (b) is the schematic illustration of the school of fish while being indicated in the state of the flasher display as shown in FIG. 11 (a).

FIG. 12 (b) is the schematic illustration of the school of fish while being indicated in the state of the flasher display as shown in FIG. 12 (a).

DETAILED DESCRIPTION OF THE INVENTION

Hereinafter, embodiments for carrying out the present invention will be described with reference to the drawings.

Figure 1:
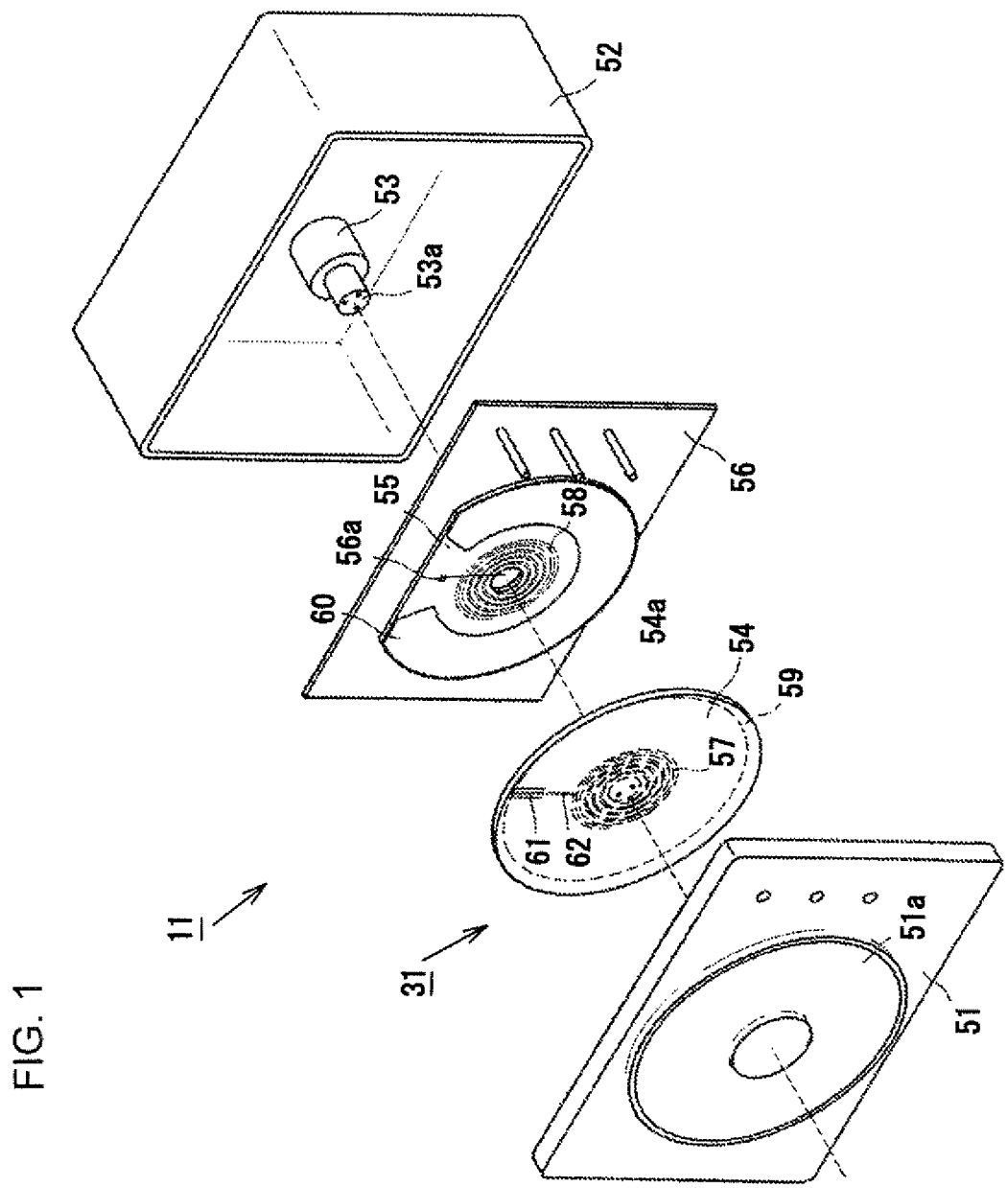
FIG. 1 is the exploded-perspective view of the flasher-type multi-frequency fish finder according to the first embodiment of the present invention.

First, the flasher-type multi-frequency fish finder 11 according to the first embodiment of the present invention will be described with reference to FIGS. 1 to 8. FIG. 1 is the exploded-perspective view of the flasher-type multi-frequency fish finder 11 according to the first embodiment of the present invention, and FIG. 2 is the side-sectional view of the flasher-type multi-frequency fish finder 11.

Figure 2:
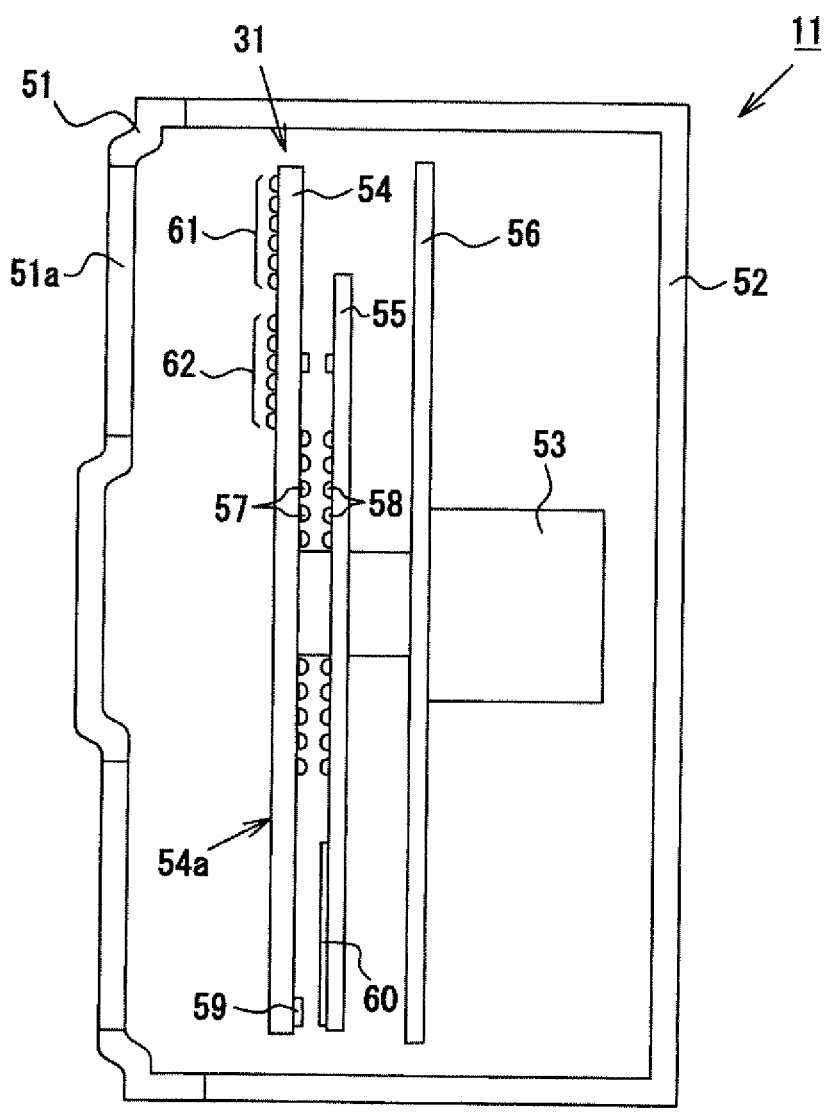
FIG. 2 is the side-sectional view of the flasher-type multi-frequency fish finder according to the first embodiment.

As shown in FIGS. 1 and 2, the case 52 of the flasher-type multi-frequency fish finder 11 is fitted with a front case 51 having a transparent display window 51a formed therein. A motor 53, a main substrate 56, a combined substrate 55, and a display-rotating disk 54 are housed inside the case 52. The motor 53 is fixed to the central portion on the back-surface side of the main substrate 56. Also, the combined substrate 55 is fixed to the surface side of the main substrate 56. The rotary shaft 53a of the motor 53 penetrates the central hole in the central portion of the combined substrate 55 and penetrates the central portion of the main substrate 56, and protrudes toward the front case 51 side. At the end of the rotary shaft 53a on the front case 51 side, a display-rotating disk 54 facing the display window 51a is fixed to the rotary shaft 53a with a screw. As such, the motor 53 rotates the display-rotating disk 54.

A power-transmission coil 58 that transmits electric power for light emission is mounted around the central-hole 56a on the combined substrate 55. A power-receiving coil 57 that receives electric power for light emission is mounted around the rotary shaft 53a of the display-rotating disk 54, which is the position on the display-rotating disk 54 facing the power-transmission coil 58. The power-receiving coil 57 and the power-transmission coil 58 are electromagnetically coupled, so that electric power is transmitted from the power-transmission coil 58 to the power-receiving coil 57.

Also, an annular transmitting antenna 60 is fixed to the outer-peripheral portion of the combined substrate 55. The annular transmitting antenna 60 transmits a reflected signal obtained by transmission/reception of an ultrasonic transducer 14 installed in water. An annular receiving antenna 59 that receives the reflected signal is mounted on the outer-peripheral portion of the display-rotating disk 54, which is the position facing the transmitting antenna 60. A radio wave of the reflected signal is transmitted from the transmitting antenna 60, and the receiving antenna 59 receives the radio wave. As a result, the reflected signal is transmitted from the combined substrate 55 side to the display-rotating disk 54 side.

Here, according to the present embodiment, a wideband ultrasonic transducer 14 is used as the ultrasonic transducer 14 that transmits ultrasonic waves into water and receives reflected signals from that water. Specifically, according to the present embodiment, the ultrasonic transducer 14 having a fractional bandwidth $\Delta f/fm$, which is the ratio of the frequency bandwidth $\Delta f$ and the center frequency $fm$ is 0.27 or more, is used. The fractional bandwidth $\Delta f/fm$ is calculated using the numerical values defined below. The value at which the transmission/reception sensitivity product is maximized within the range of 100 kHz to 340 kHz is defined as the "maximum transmission/reception sensitivity product". The range of frequencies at which the transmission/reception sensitivity product is 0 dB to 6 dB lower than the maximum transmission/reception sensitivity product is defined as the "frequency band". The lower-limit frequency in the frequency band is defined as "lower limit frequency". The upper-limit frequency in the frequency band is defined as "upper limit frequency". The intermediate value between the lower-limit frequency and the upper-limit frequency is defined as "center frequency $fm$". The difference between the lower limit frequency and the upper limit frequency is defined as "frequency bandwidth Δf". The configuration of the case in point for the wideband ultrasonic transducer 14 is disclosed in the specification of Japanese Patent Publication Nos. 6732274 and 6928944, and this embodiment basically employs this configuration.

A plurality of display LEDs 61 and a plurality of character display LEDs 62 are respectively fixed on the display surface 54a of the display-rotating disk 54 facing the display window 51a of the front case 51. According to the present embodiment, as the display LED 61 and the character display LED 62, a color LED capable of emitting a plurality of chromatic color lights such as red, green, yellow, orange, blue, purple or the like is used.

Figure 3:
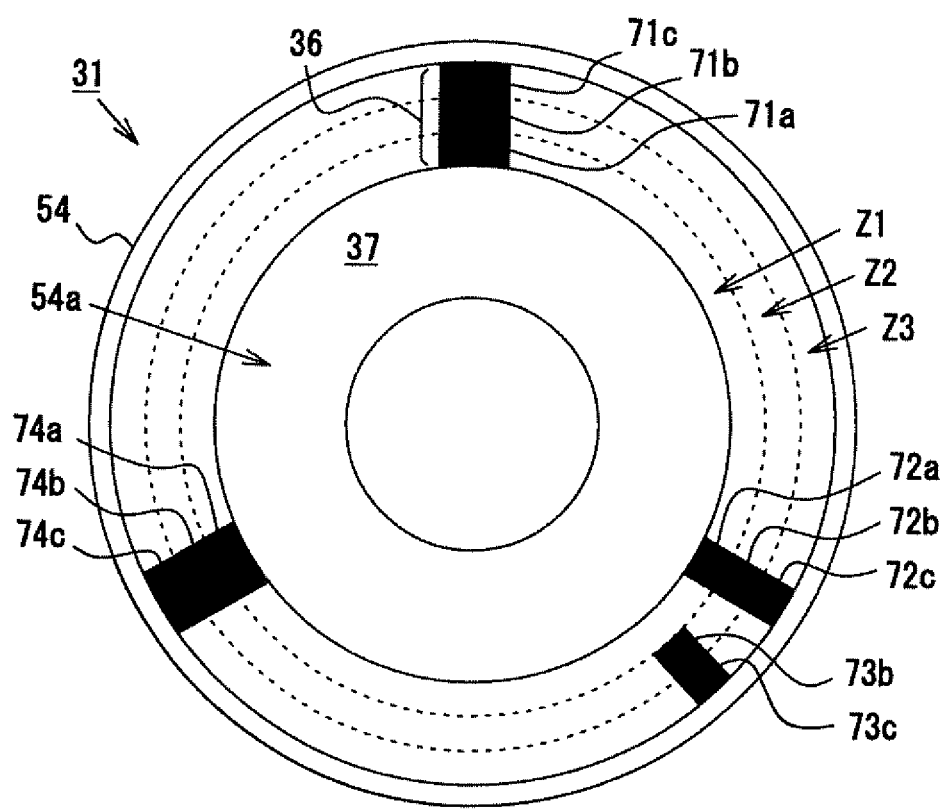
FIG. 3 is the diagram showing the flasher display of the flasher-type multi-frequency fish finder according to the first embodiment.
Figure 4:
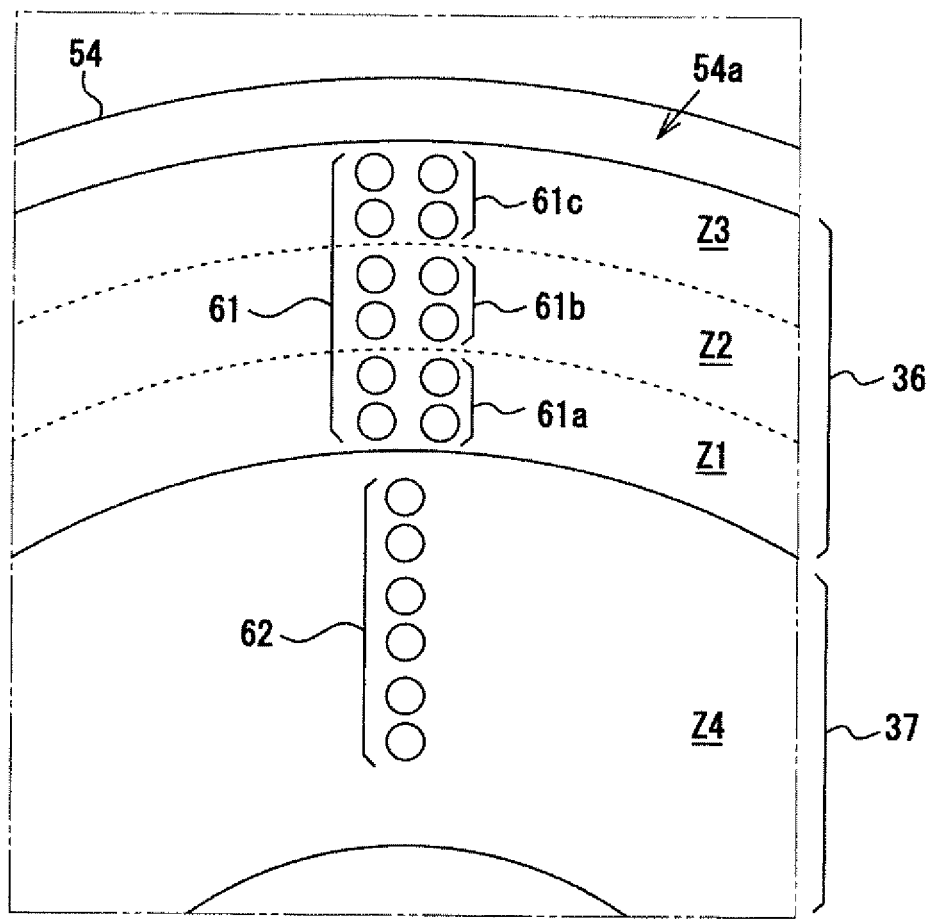
FIG. 4 is the partially enlarged view showing the layout of the display LED of the flasher-type multi-frequency fish finder according to the first embodiment.

FIG. 3 is a diagram showing the flasher display 31 of the flasher-type multi-frequency fish finder 11 according to the first embodiment. FIG. 4 is a partially enlarged view showing the layout of the display LED 61 of the multi-frequency fish finder 11.

As shown in FIG. 4, a plurality of display LEDs 61 are arranged in two rows along the radial direction of the display-rotating disk 54 at the outer-peripheral portion on the display surface 54a. Here, the plurality of display LEDs 61 are laid out so as to have six in two rows. The plurality of display LEDs 61 include a first display LED 61a, a second display LED 61b, and a third display LED 61c.

The first display LED 61a is a four-display LED 61 arranged on the inner peripheral side of the display-rotating disk 54 among a group of the above-mentioned display LEDs 61. The region corresponding to the rotation locus of the first display LED 61a is defined as the first annular display region Z1 on the display surface 54a. The second display LED 61b is a four-display LED 61 arranged on the outer-peripheral side rather than the first display LED 61a. The region corresponding to the rotation locus of the second display LED 61b is defined as the second annular display region Z2 surrounding the first annular display region Z1. The third display LED 61c is a four-display LED 61 arranged on the outer-peripheral side rather than the second display LED 61b. The region corresponding to the rotation locus of the third display LED 61c is defined as the third annular-display region Z3 surrounding the second annular-display region Z2. That is, on the display surface 54a of the present embodiment, the first annular-display region Z1, the second annular-display region Z2, and the third annular-display region Z3 are concentrically set. Then, the fish finding display part 36 is composed of the first, second, and third annular display regions Z1, Z2, and Z3.

On the other hand, the plurality of character-display LEDs 62 are arranged in a row along the radial direction of the display-rotating disk 54 at a portion closer to the center on the display surface 54a rather than the display LED 61. The area corresponding to the rotation locus of the character display LED 62 is defined as the character display region Z4. The character-display region Z4 configures the character-display part 37.

FIG. 3 shows the state in which red-light line segments 71a, 71b, and 71c corresponding to the water surface 91 are indicated in the first, second and third annular display regions Z1, Z2, and Z3 at the 0 o'clock position when the display surface 54a is viewed as a clock face. Similarly, the red-light line segments 72a, 72b and 72c corresponding to the fish school 77 are indicated in the first, second and third annular display regions Z1, Z2 and Z3 at the 4 o'clock position. Similarly, the red-light line segments 73b and 73c corresponding to the fish school 77 are indicated in the second and third annular display regions Z2 and Z3 at the intermediate positions between 4 o'clock and 5 o'clock. Then, similarly, the red-light line segments 74a, 74b, and 74c corresponding to the water bottom 93 are indicated in the first, second, and third annular display regions Z1, Z2, and Z3 at the 8 o'clock position.

Figure 5:
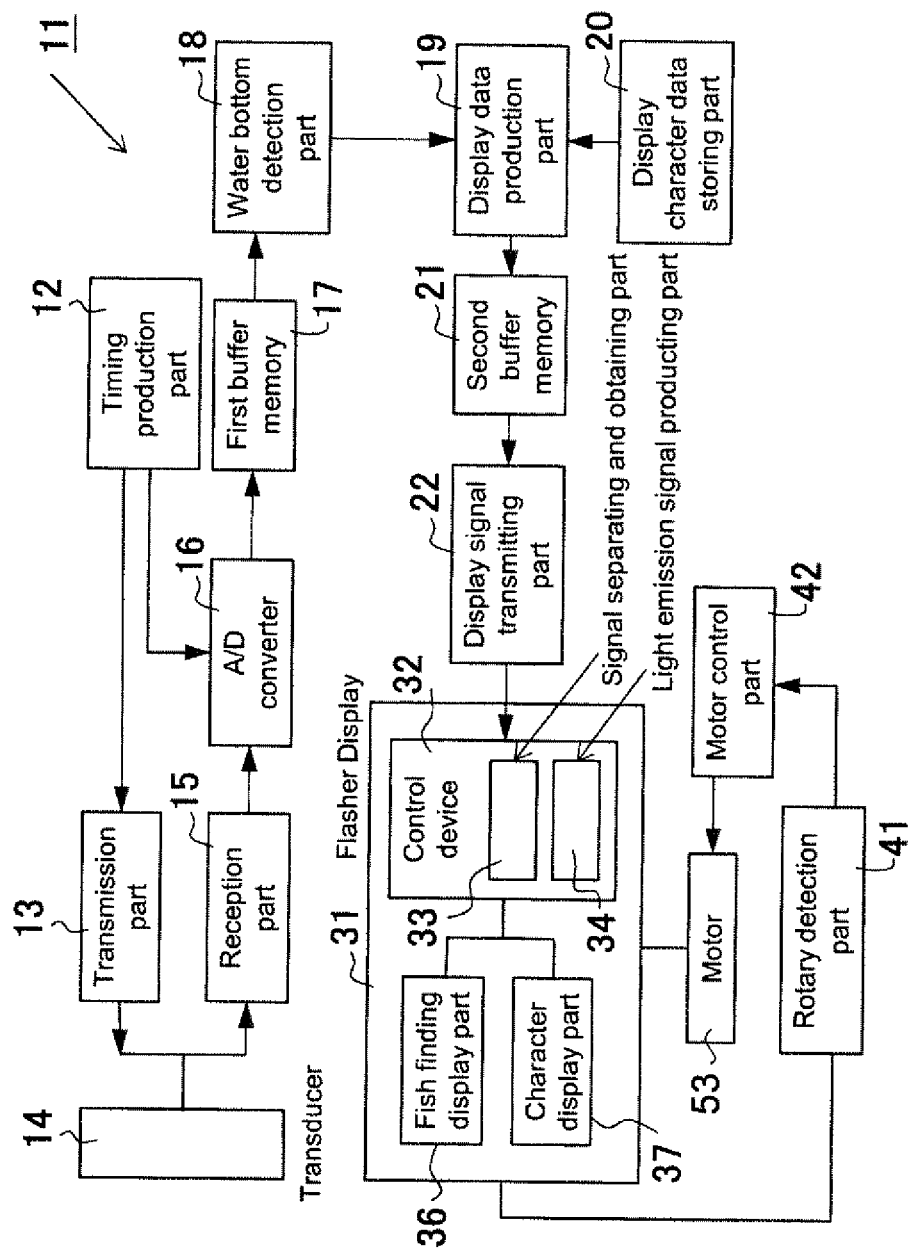
FIG. 5 is the block diagram of the flasher-type multi-frequency fish finder according to the first embodiment.

FIG. 5 is a block diagram showing the electrical configuration of the flasher type multi-frequency fish finder 11. According to the flasher type multi-frequency fish finder 11, the ultrasonic transducer 14 is electrically connected to the transmission part 13 and the reception part 15. The timing production part 12 is electrically connected to the transmission part 13, and the A/D converter 16 is electrically connected to the reception part 15. The timing production part 12 is electrically connected to the A/D converter 16. The output of the A/D converter 16 is input to the first buffer memory 17. The output from the first buffer memory 17 is input to the water bottom detection part 18. Then, the output from the water bottom detection part 18 is input to the display data production part 19 electrically connected to the display character data storing part 20. The output from the display data production part 19 is input to the second buffer memory 21. The output from the second buffer memory 21 is input to the display signal transmitting part 22. The output from the display signal transmitting part 22 is input to the control device 32 included in the flasher display 31.

The control device 32 has, for example, a CPU, a ROM, a RAM, and the like, and produces a light-emission signal for causing the display LEDs 61 and 62 to emit light based on the reflected signal output from the display signal transmitting part 22. The control device 32 has a signal separating and obtaining part 33 and a light emission signal producing part 34. The signal separating and obtaining part 33 separates the reflected signal and obtains the first reflected signal corresponding to the high frequency, the second reflected signal corresponding to the medium frequency, and the third reflected signal corresponding to the low frequency. Specific examples of the method for separating the reflected signals to obtain the reflected signals of three different frequencies are as follows.

The first method is to conduct transmission and reception by using ultrasonic chirp waves of which frequency increases or decreases with time, and to conduct separation of the reflected signals of a high frequency, a medium frequency and a low frequency respectively from the obtained reflected signals. The second method is to conduct transmission and reception while switching frequencies by using ultrasonic burst waves, and to conduct separation of the reflected signals of a high frequency, a medium frequency and a low frequency respectively from the obtained reflected signals. The third method is to conduct transmission and reception by using ultrasonic impulse waves, and to conduct an FFT analysis of the obtained reflected signals (fast Fourier transform analysis) so as to separate the reflected signals of a high frequency, a medium frequency and a low frequency, respectively. The fourth method is to conduct transmission and reception by using ultrasonic waves superimposed with burst waves of three or more frequencies, and to conduct an FFT analysis of the obtained reflected signals (fast Fourier transform analysis) so as to separate the reflected signals of a high frequency, a medium frequency and a low frequency, respectively.

Also, the present embodiment allows the signal separating and obtaining part 33 to obtain a reflected signal at a high frequency of around 275 kHz, a reflected signal at a medium frequency of around 225 kHz, and a reflected signal at a low frequency of around 175 kHz.

The light emission signal producing part 34 produces a first light emission signal based on the first reflected signal corresponding to a high frequency, produces a second light emission signal based on a second reflected signal corresponding to a medium frequency, and produces a third light emission signal based on the third reflected signal corresponding to a low frequency. Then, the light emission signal producing part 34 in the control device 32 outputs the produced first, second and third reflected signals to the fish finding display part 36. In other words, the light emission signal producing part 34 outputs the first light emission signal to the first display LED 61a, then outputs the second light emission signal to the second display LED 61b, and further outputs the third light emission signal to the third display LED 61c. Furthermore, the control device 32 outputs a light emission signal including character display data to the character display LED 62 constituting the character display part 37.

Also, according to the flasher-type multi-frequency fish finder 11, the rotation speed of the display-rotating disk 54 rotationally driven by the motor 53 is detected by the rotary detection part 41. The rotary detection part 41 is electrically connected to the motor control part 42. The rotational speed signal from the rotary detection part 41 is input to the motor control part 42. The motor control part 42 is electrically connected to the motor 53 to control appropriately the rotation speed of the motor 53.

Next, the operation of the flasher type multifrequency fish finder 11 will be described.

When the timing signal from the timing production part 12 is input to the ultrasonic transducer 14, a wideband ultrasonic wave is emitted from the ultrasonic transducer 14 into the water. The reflected signal of the ultrasonic wave from the water is received by the ultrasonic transducer 14, is amplified by the reception part 15, and is then converted from an analog signal to a digital signal by the A/D converter 16. The digitally converted reflected signal is temporarily stored in the first buffer memory 17. The reflected signal that was read from the first buffer memory 17 is input to the water bottom detection part 18, and data regarding the water bottom detection result is added there. The output signal from the water bottom detection part 18 is temporarily stored in the second buffer memory 21 after the display data signal is added by the display data production part 19. The output signal that was read from the second buffer memory 27 is input to the control device 32 via the display signal transmitting part 22. The signal separating and obtaining part 33 of the control device 32 separates the input reflected signal into three signals that are the first, second, and third reflected signals. The light emission signal producing part 34 produces first, second, and third light emission signals based on the first, second, and third reflected signals. Then, the control device 32 outputs the produced first, second, and third light emission signals to the first, second and third display LEDs 61a, 61b, and 61c to cause them to emit light at predetermined timings. As a result, red-light line segments corresponding to the underwater detection results simultaneously appear in the first, second, and third annular display regions Z1, Z2, and Z3 that are set concentrically on the display surface 54a.

In other words, the underwater-detection result corresponding to the high frequency having a narrow directional angle is indicated in the first annular display region Z1 located on the innermost peripheral side of the fish finding display part 36. Also, the underwater detection result corresponding to the low frequency having a wide directional angle is indicated in the third annular display region Z3 located on the outermost peripheral side of the fish finding display part 36. Further, the underwater detection result corresponding to the medium frequency having a medium directional angle is indicated in the second annular display region Z2 that is the region between them. From this indication, the user can grasp the positional relationship between the water surface 91, the water bottom 93, and the fish school 77.

Furthermore, if necessary, the control device 32 outputs the character-display data signal included in the light-emission signal to the character display LED 62 so as to cause the character display LED 62 to emit light. As a result, predetermined characters are indicated on the character-display part 30. Specifically, the character display LED 62 displays characters (for example, AUTO-R 9.5FEET, etc.) indicating the underwater-detection conditions and the like.

Figure 6:
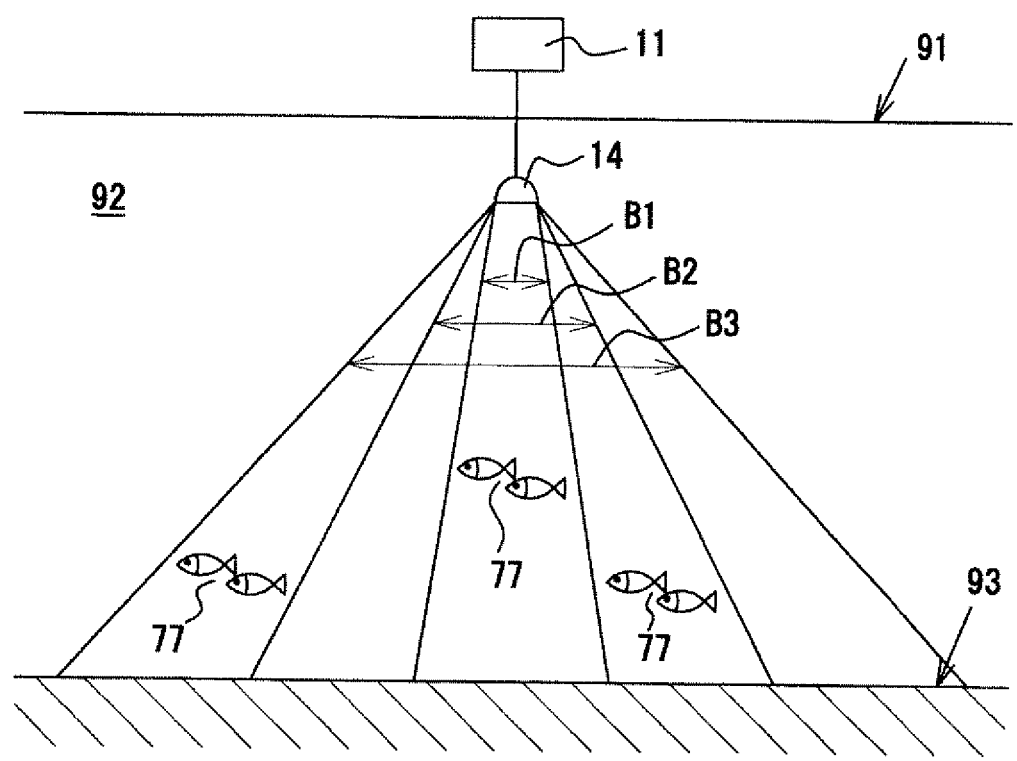
FIG. 6 is the schematic illustration of the school of fish while being indicated in the state of the flasher display as shown in FIG. 3.

FIG. 6 is a schematic diagram illustrating the fish school 77 in the state of the flasher display shown in FIG. 3. In FIG. 6, the water surface is represented by 91, the water is represented by 92, and the water bottom is represented by 93. Also in FIG. 6, a high-frequency ultrasonic beam having a narrow directional angle is represented by B1, a medium-frequency ultrasonic beam having a medium directional angle is represented by B2, and a low-frequency ultrasonic beam having a wide directional angle is represented by B3. In FIG. 3, as described above, the red-light line segments 72a, 72b, and 72c are indicated in all of the first, second, and third annular display regions Z1, Z2, and Z3 at the 4 o'clock position. That is, the high-frequency ultrasonic beam B1 having a narrow directional angle, the medium-frequency ultrasonic beam B2 having a medium directional angle, and the low-frequency ultrasonic beam B3 having a wide directional angle all capture the fish school 77. From this fact, it can be seen that the fish school 77 exists at a depth corresponding to the position at 4 o'clock, and the fish school 77 exists directly underneath the ultrasonic transducer 14.

Further, the red-light line segments 73b and 73c corresponding to the fish school 77 are also indicated in the second and third annular display regions Z2 and Z3 at the intermediate positions between 4 o'clock and 5 o'clock. On the other hand, the red-light line segment corresponding to the fish school 77 is not indicated in the first annular display region Z1 at the intermediate position between 4 o'clock and 5 o'clock. In other words, the fish school 77 is captured by the medium-frequency ultrasonic beam B2 having a medium directional angle and by the low-frequency ultrasonic beam B3 having a wide directional angle. On the other hand, the high-frequency ultrasonic beam B1 having a narrow directional angle is not reflected by the fish school 77. From this fact, it can be seen that in a deeper region of water, the fish school 77 exists at a position slightly away in the horizontal direction from directly beneath the ultrasonic transducer 14.

Figure 7A:
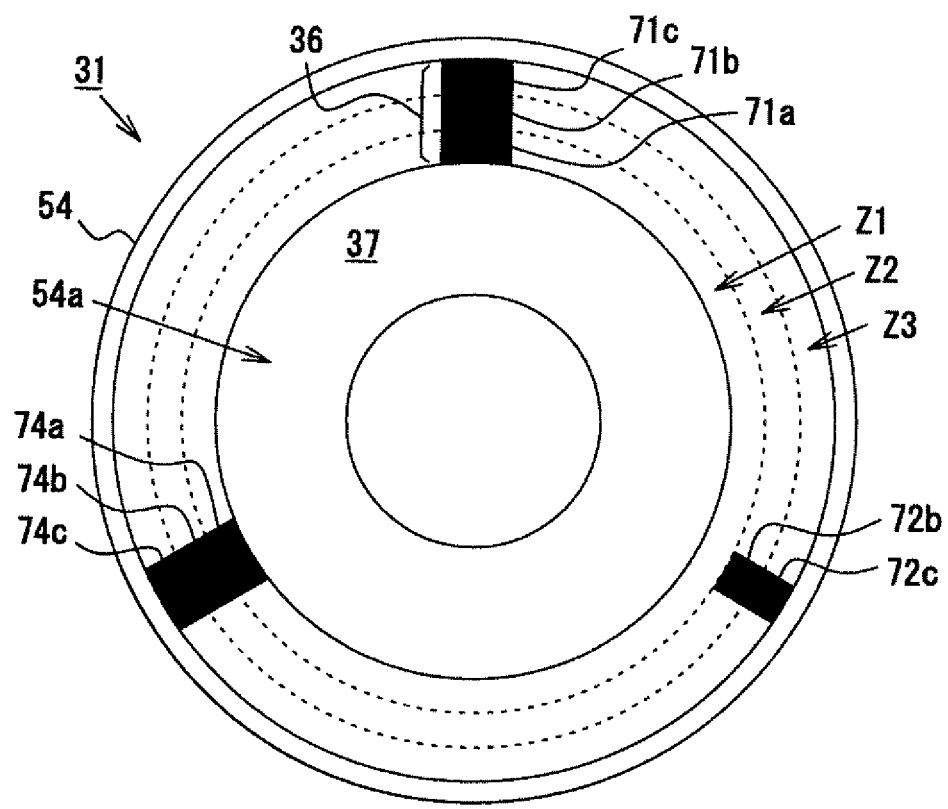
FIG. 7 (a) is the diagram showing another state of the flasher display of the flasher-type multi-frequency fish finder according to the first embodiment.
Figure 7B:
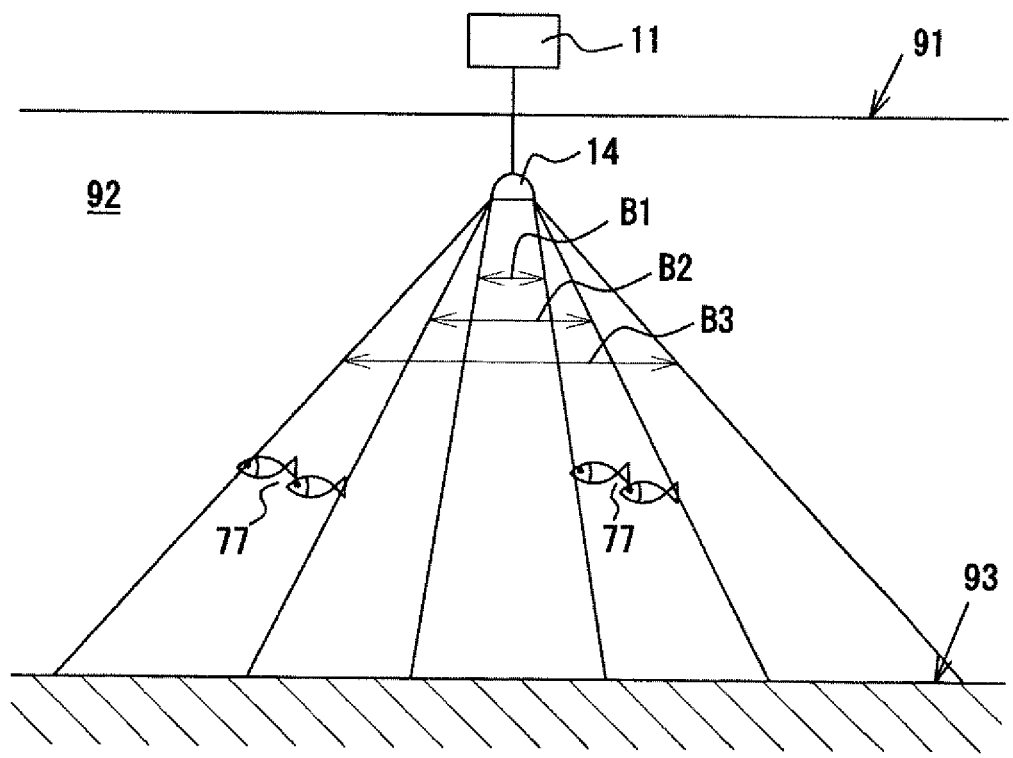

FIG. 7 (a) is the diagram showing another state of the flasher display. FIG. 7 (b) is a schematic diagram illustrating the fish school 77 in the state of the flasher display shown in FIG. 7 (a). In FIG. 7 (a), the red-light line segments 72b and 72c are indicated in the second and third annular display regions Z2 and Z3 at the 4 o'clock position. On the other hand, the red-light line segment corresponding to the fish school 77 is not indicated in the first annular display region Z1. In other words, the fish school 77 is captured by the medium-frequency ultrasonic beam B2 having a medium directional angle and by the low-frequency ultrasonic beam B3 having a wide directional angle. On the other hand, the high-frequency ultrasonic beam B1 having a narrow directional angle does not capture the fish school 77. From this fact, it can be seen that the fish school 77 exists at a depth corresponding to the position at 4 o'clock and at a position slightly away in the horizontal direction from directly beneath the ultrasonic transducer 14.

Figure 8A:
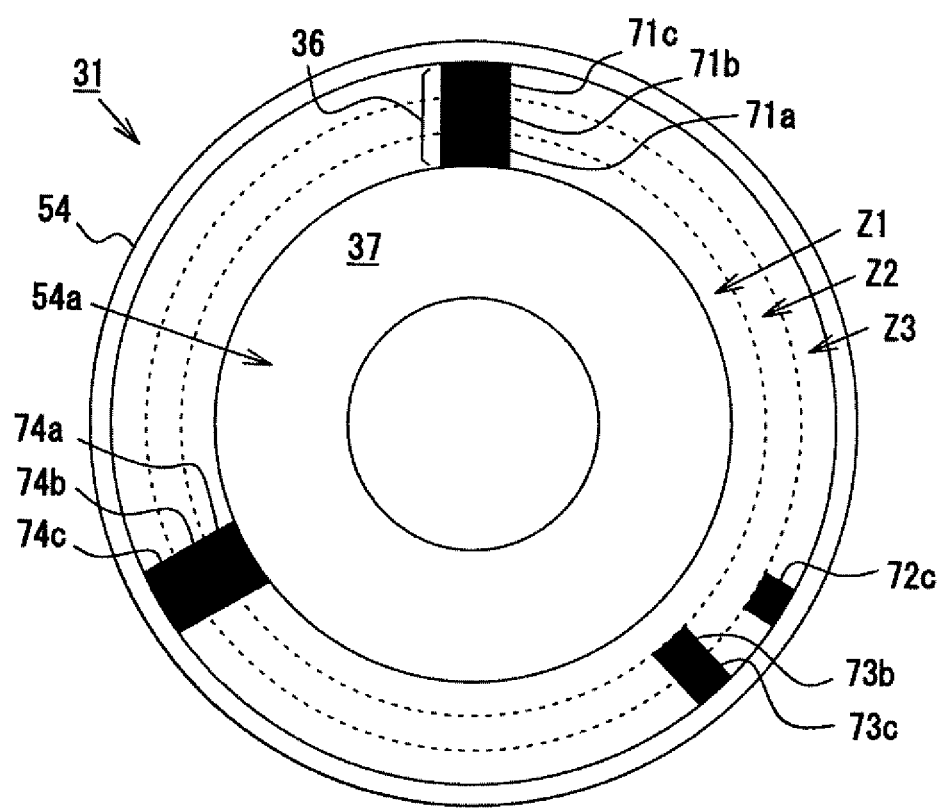
FIG. 8 (a) is the diagram showing another state of the flasher display of the flasher-type multi-frequency fish finder according to the first embodiment.
Figure 8B:
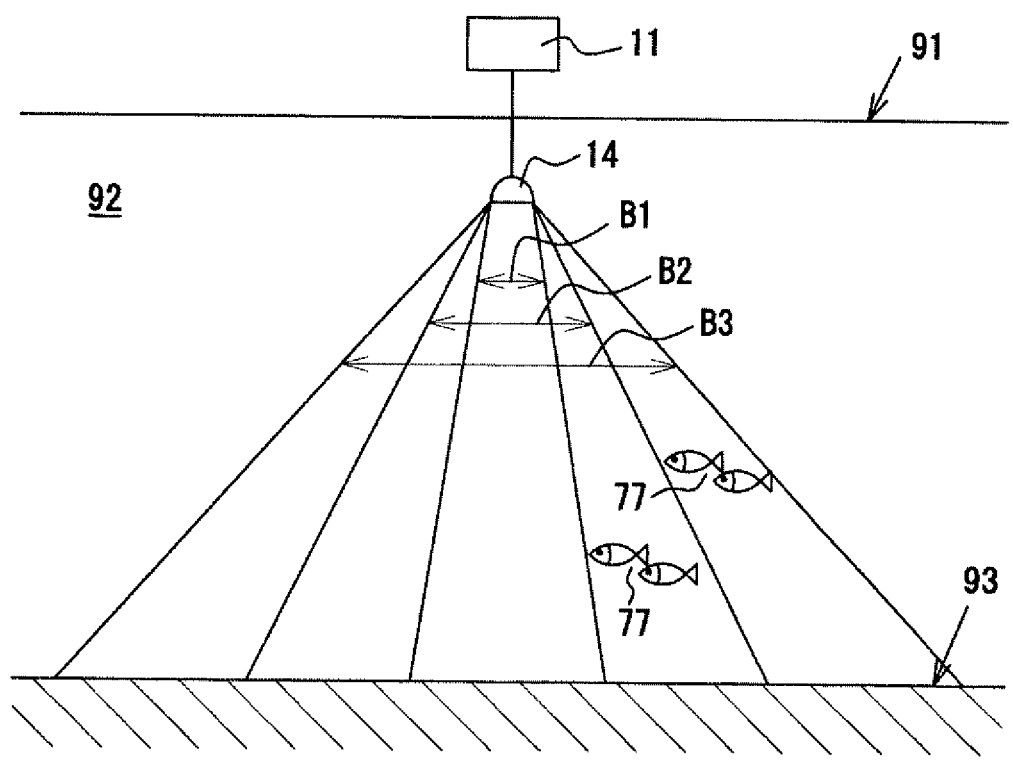

FIG. 8 (a) is a diagram showing another state of the flasher display. FIG. 8 (b) is a schematic diagram illustrating the fish school 77 in the state of the flasher display shown in FIG. 8 (a). In FIG. 8 (a), the red-light line segments 72b and 72c are indicated in the third annular display region Z3 at the 4 o'clock position. On the other hand, the red-light line segment corresponding to the fish school 77 is not indicated in the first and second annular display regions Z1 and Z2. In other words, the low-frequency ultrasonic beam B3 having a wide directional angle captures the fish school 77. On the other hand, the fish school 77 is captured by a medium-frequency ultrasonic beam B2 having a medium directional angle and by a high-frequency ultrasonic beam B1 having a narrow directional angle. From this fact, it can be seen that the fish school 77 exists at a depth corresponding to the position of 4 o'clock and at a position horizontally separated from directly beneath the ultrasonic transducer 14.

Furthermore, the red-light line segment 73c corresponding to the fish school 77 is indicated in the third annular display region Z3 at the intermediate position between 4 o'clock and 5 o'clock. On the other hand, the red-light line segment corresponding to the fish school 77 is not indicated in the first and second annular display regions Z1 and Z2 at the intermediate positions between 4 o'clock and 5 o'clock. In other words, the fish school 77 is captured by the low-frequency ultrasonic beam B3 having a wide directional angle. On the other hand, the fish school 77 is not captured by the medium-frequency ultrasonic beam B2 having a medium directional angle or by the high-frequency ultrasonic beam B1 having a narrow directional angle. From this fact, it can be seen that the fish school 77 exists at a position horizontally separated from directly beneath the ultrasonic transducer 14 even in a deeper region in the water.

As described above, according to the flasher type multi-frequency fish finder 11 of the first embodiment, the first, second and third annular display regions Z1, Z2 and Z3 are concentrically set on the display surface 54a. As such, it is possible to simultaneously indicate by a flashing light the underwater-detection results by using three frequencies in an easy manner to understand instinctively. Also, the reflected signal that was received by the wideband ultrasonic transducer 14 is separated by the signal separating and obtaining part 33 so as to obtain the first, second and third reflected signals. Further, the light emission signal producing part 34 produces the first, second, and third light emission signals based on each reflected signal. Therefore, an ultrasonic transducer 14 and a transmission/reception circuit for each frequency are not required, thus making it possible to avoid a complex configuration, a large size, and a high cost of the device.

Also, according to the flasher type multi-frequency fish finder 11 of the first embodiment, the underwater-detection result corresponding to the high frequency having a narrow directional angle is indicated on the innermost peripheral side of the fish finding display part 36. Further, the underwater detection result corresponding to the low frequency having a wide directional angle is indicated on the outermost side of the fish finding display part 36. Then, the underwater detection result corresponding to the medium frequency having a medium directional angle is indicated in the region between them. As a result, the underwater detection result by using three frequencies can be indicated in an easier manner to understand instinctively.

Here, the first and second modifications of the flasher type multi-frequency fish finder 11 of the first embodiment will be described.

Figure 9A:
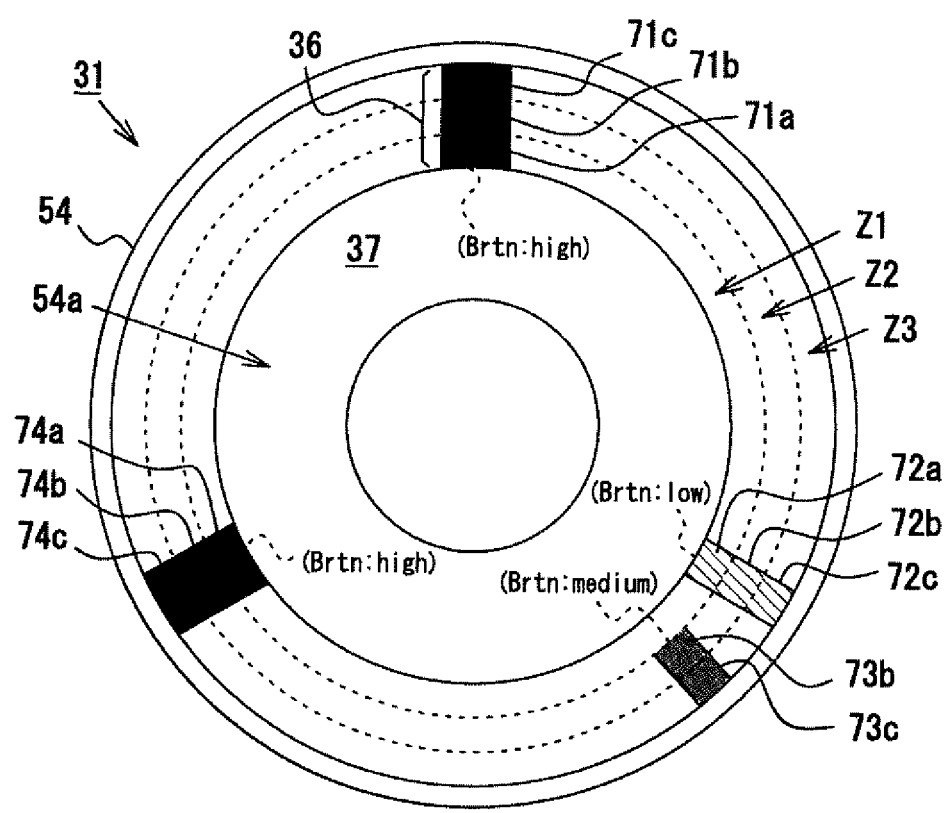
FIG. 9 (a) is the diagram showing the state of the flasher display of the flasher-type multi-frequency fish finder as the first modification according to the first embodiment.
Figure 9B:
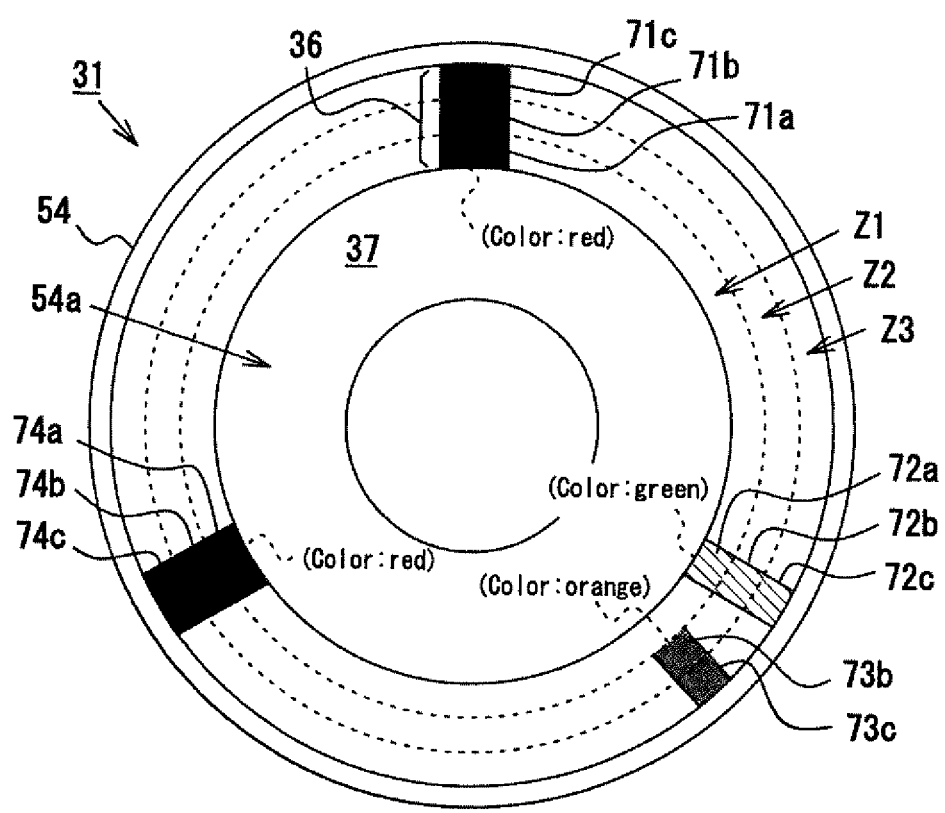
Figure 9C:
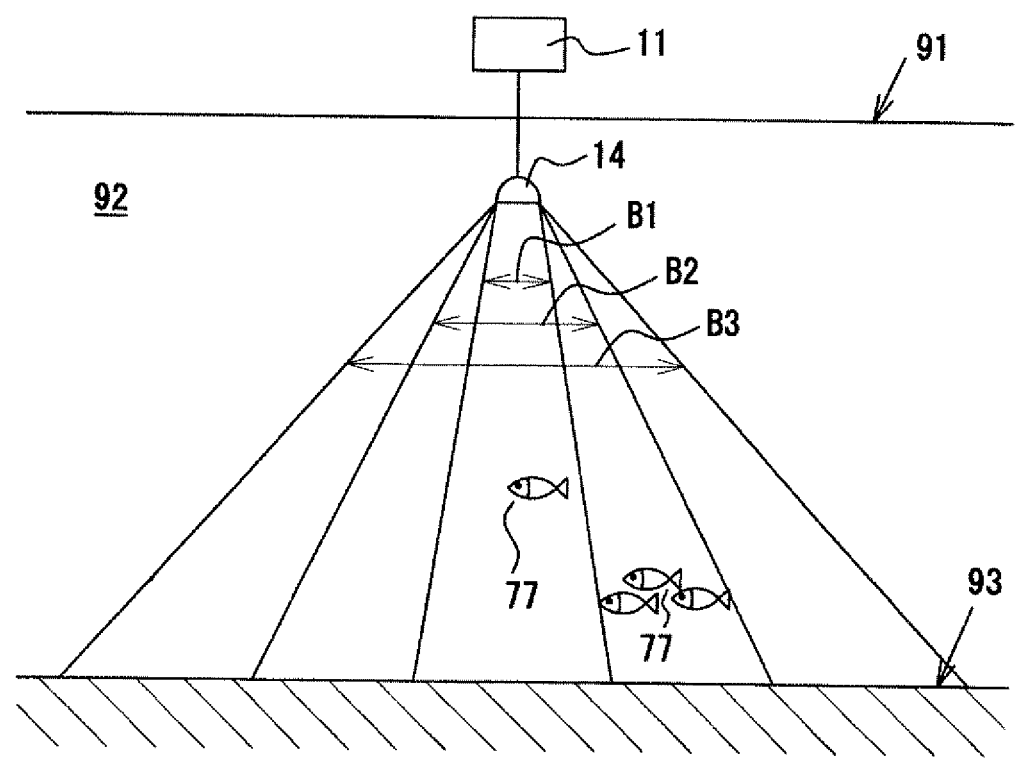

According to the first modification, the light emission signal producing part 34 performs luminance modulation to replace the intensities of the first, second, and third reflected signals with luminance. FIG. 9(a) is a diagram showing the state of the flasher display for the first modification. FIG. 9 (c) is a schematic diagram illustrating the fish school 77 in the state of the flasher display shown in FIG. 9 (a).

As can be seen in FIG. 9 (a), the display surface 54(a) shows each line segment at the same position as that shown in FIG. 3. In other words, the red-light line segments 71a, 71b, and 71c corresponding to the water surface 91 are indicated in the first, second, and third annular display regions Z1, Z2, and Z3 at the 0 o'clock position of the display surface 54a. Similarly, the red-light line segments 74a, 74b and 74c corresponding to the water bottom 93 are indicated in the first, second and third annular display regions Z1, Z2 and Z3 at the 8 o'clock position. According to this embodiment, these line segments 71a, 71b, 71c, 74a, 74b, and 74c are indicated with high luminance (Brightness: Brtn.). Similarly, the red-light line segments 72a, 72b and 72c corresponding to the fish school 77 are indicated in the first, second and third annular display regions Z1, Z2 and Z3 at the 4 o'clock position. According to this embodiment, these line segments 72a, 72b, and 72c are indicated with low luminance. Similarly, the red-light line segments 73b and 73c corresponding to the fish school 77 are indicated in the second and third annular display regions Z2 and Z3 at the intermediate positions between 4 o'clock and 5 o'clock. According to this embodiment, these line segments 73b and 73c are indicated with medium luminance. In addition, the red-light line segment is not indicated in the first annular display region Z1 at the intermediate position between 4 o'clock and 5 o'clock.

Then, the user who sees the flasher display of FIG. 9 (a) can understand that the scale of the fish school 77, the depth position, and the horizontal position where the fish school 77 exists in the water are in a similar state as shown in FIG. 9 (c). In other words, the brightness of the line segments 71a, 71b, 71c, 74a, 74b and 74c at the positions of 0 o'clock and 8 o'clock is high. Thus, it can be seen that these line segments 71a, 71b, 71c, 74a, 74b and 74c indicate the positions of the water surface 91 and the water bottom 93, respectively, not the fish school 77. Also, the brightness of the line segments 72a, 72b and 72c in the first, second, and third annular display regions Z1, Z2, and Z3 at the 4 o'clock position is low. Thus, it can be seen that the fish school 77 exists at a depth corresponding to the position at 4 o'clock, and that the fish school 77 exists directly beneath the ultrasonic transducer 14. At the same time, it can be seen that the scale of the fish school 77 is relatively small. Further, the brightness of the line segments 73b and 73c in the second and third annular display regions Z2 and Z3 at the intermediate position between 4 o'clock and 5 o'clock is medium. Therefore, it can be seen in a region deeper than the depth corresponding to the 4 o'clock position that the fish school 77 exists at a position slightly away in the horizontal direction from directly beneath the ultrasonic transducer 14. At the same time, it can be seen that the scale of the fish school 77 is relatively large.

According to the second modification, the light emission signal producing part 34 performs a color modulation so as to replace the intensities of the first, second, and third reflected signals with chromatic colors. FIG. 9 (b) is the diagram showing the state of the flasher display of the flasher-type multi-frequency fish finder as the second modification. FIG. 9 (c) is the schematic illustration of the fish school 77 while being indicated in the state of the flasher display as shown in FIG. 9 (b). According to this embodiment, when the intensity of the reflected signal is high, the light emission signal producing part 34 produces a light emission signal that causes the first, second, and third display LEDs 61a, 61b, and 61c to emit light in red. When the intensity of the reflected signal is medium, the light emission signal producing part 34 produces a light-emission signal that causes the first, second, and third display LEDs 61a, 61b, and 61c to emit light in orange. When the intensity of the reflected signal is low, the light emission signal producing part 34 produces a light-emission signal that causes the first, second, and third display LEDs 61a, 61b, and 61c to emit light in green.

As shown in FIG. 9 (b), each line segment is indicated on the display surface 54a at the same position as that shown in the first modification. According to this embodiment, the line segments 71a, 71b, 71c, 74a, 74b and 74c at the positions of 0 o'clock and 8 o'clock are indicated in red. The line segments 72a, 72b and 72e in the first, second, and third annular display regions Z1, Z2 and Z3 at the 4 o'clock position are indicated in green. The line segments 73b and 73c in the second and third annular display regions Z2 and Z3 at the intermediate positions between 4 o'clock and 5 o'clock are indicated in orange.

Then, the user who sees the flasher display of FIG. 9 (b) can understand that the scale of the fish school 77, the depth position, and the horizontal position where the fish school 77 exists in the water are in a similar state, as shown in FIG. 9 (c). In other words, the line segments 71a, 71b, 71c, 74a, 74b and 74c at the positions of 0 o'clock and 8 o'clock are red, which means a high-intensity reflected signal. Thus, it can be seen that these line segments 71a, 71b, 71c, 74a, 74b and 74c indicate the positions of the water surface 91 and the water bottom 93, respectively, not the fish school 77. Further, the line segments 72a, 72b and 72c in the first, second and third annular display regions Z1, Z2 and Z3 at the 4 o'clock position are green, which means a low-intensity reflected signal. Therefore, it can be seen that the fish school 77 exists at a depth corresponding to the position at 4 o'clock, and that the fish school 77 exists directly beneath the ultrasonic transducer 14. At the same time, it can be seen that the scale of the fish school 77 is relatively small. Furthermore, the line segments 73b and 73c in the second and third annular display regions Z2 and Z3 at the intermediate positions between 4 o'clock and 5 o'clock are orange, which means a medium-intensity reflected signal. Therefore, it can be seen in a region deeper than the depth corresponding to the 4 o'clock position that the school of fish 77 exists at a position slightly away in the horizontal direction from directly beneath the ultrasonic transducer 14. At the same time, it can be seen that the scale of the fish school 77 is relatively large.

Figure 10A:
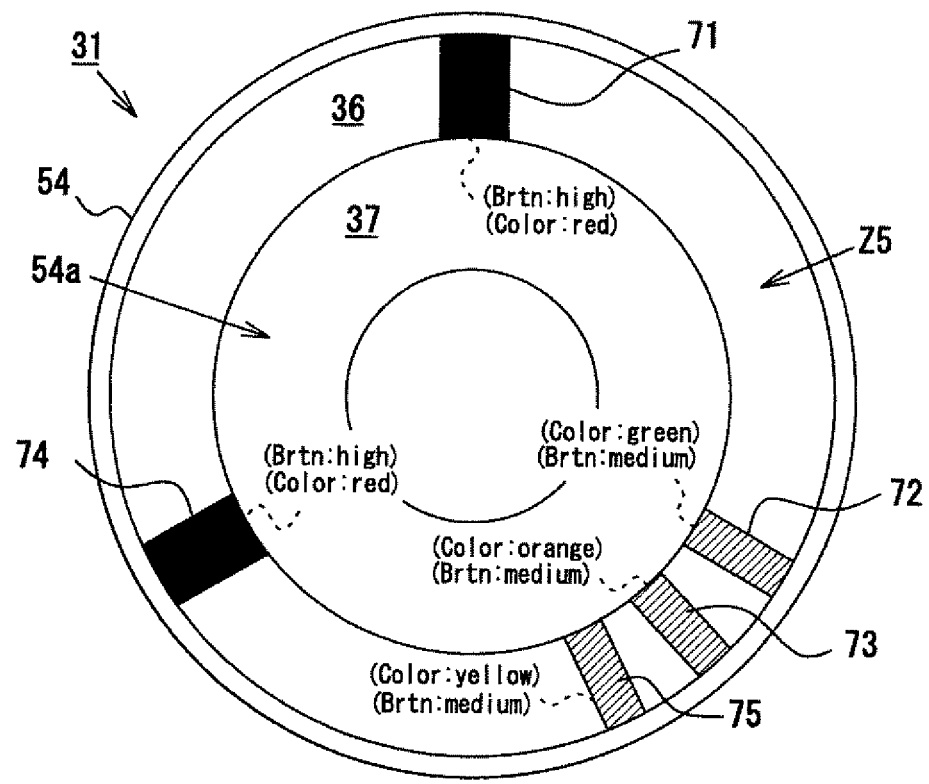
FIG. 10 (a) is the diagram showing the flasher display of the flasher-type multi-frequency fish finder according to the second embodiment.
Figure 10B:
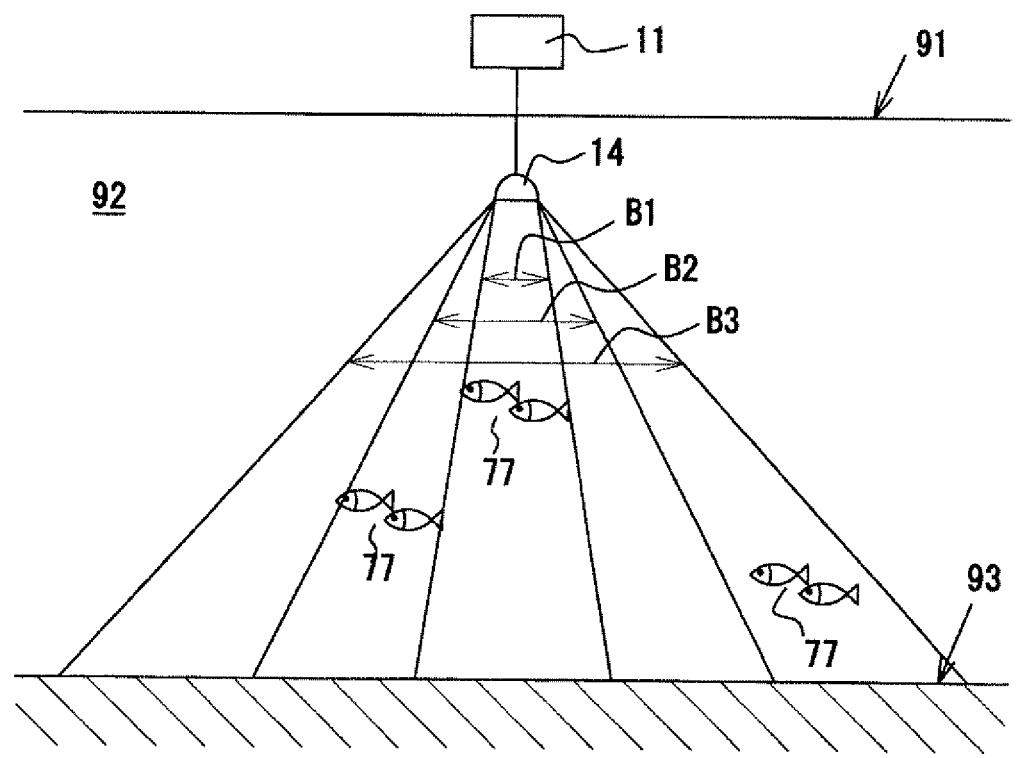

Next, a flasher type multi-frequency fish finder 11 according to the second embodiment of the present invention will be described. FIG. 10(a) is the diagram showing the flasher display 31A of the flasher type multi-frequency fish finder 11 according to the second embodiment. FIG. 10 (b) is a schematic diagram illustrating the fish school 77 in the state of the flasher display as shown in FIG. 10 (a). The description of the configuration of the second embodiment in common with the first embodiment will be omitted here, and the different configurations will be described.

As shown in FIG. 10 (a), according to the flasher type multi-frequency fish finder 11 of the present embodiment, the annular display region Z5 is set on the display surface 54a, and the annular display region Z4 is set on the inner peripheral side of the annular display region Z5. Here, the region corresponding to the rotation locus of the plurality of display LEDs 61 is defined as the annular display region Z5. The fish finding display part 36 is configured by this annular display region Z5. The region corresponding to the rotation locus of the plurality of character display LEDs 62 is defined as the character display region Z4. The character display part 37 is configured by the character display region Z4.

The control device 32 of the flasher type multi-frequency fish finder 11, according to the present embodiment, has a signal separating and obtaining part 33 and a light emission signal producing part 34, similarly in the case of the first embodiment. The signal separating and obtaining part 33 separates the reflected signal and obtains the first reflected signal corresponding to the high frequency, the second reflected signal corresponding to the medium frequency, and the third reflected signal corresponding to the low frequency.

The light emission signal producing part 34 produces first, second, and third light-emission signals based on the first, second, and third reflection signals, respectively. Specifically, the light emission signal producing part 34 performs luminance modulation of the first reflected signal corresponding to a high frequency and replaces the intensity with the luminance. Then, the light emission signal producing part 34 produces a first light-emission signal that causes the display LED 61 to emit light in the first chromatic color. In this embodiment, green is assigned as the first chromatic color. The light emission signal producing part 34 performs luminance modulation of the second reflected signal corresponding to the medium frequency and replaces the intensity with the luminance. Then, the light emission signal producing part 34 produces a second light-emission signal that causes the display LED 61 to emit light in the second chromatic color. In this embodiment, orange is assigned as the second chromatic color. The light emission signal producing part 34 performs luminance modulation of the third reflected signal corresponding to a low frequency and replaces the intensity with the luminance. Then, the light emission signal producing part 34 produces a third light-emission signal that causes the display LED 61 to emit light in a third chromatic color. In this embodiment, yellow is assigned as the third chromatic color.

Then, the control device 32 outputs the produced first, second, and third light emission signals to the display LED 61 and causes the display LED 61 to emit light at a predetermined timing. As a result, red, orange, and yellow line segments simultaneously appear in the annular display region Z5 set on the display surface 54a, according to the underwater-detection result of each frequency. Further, the control device 32 outputs a light-emission signal including character-display data to the character display LED 62 constituting the character display part 37.

Then, the user who sees the flasher display of FIG. 10 (a) can understand that the scale of the fish school 77, the depth position and the horizontal position where the fish school 77 exists in the water are in a similar state as shown in FIG. 10 (c). In other words, the line segments 71 and 74 in the annular display region Z5 at the 0 o'clock and 8 o'clock positions are of high-luminance and red, which means a high-intensity reflected signal. Therefore, it can be seen that these line segments 71 and 74 indicate the positions of the water surface 91 and of the water bottom 93, respectively, not of the fish school 77.

Also, a line segment 72 is indicated in the annular display region Z5 at the 4 o'clock position based on the first light-emission signal. The line segment 72 in the annular display region Z5 at the 4 o'clock position is of medium luminance that means a medium-intensity reflected signal and is indicated in green that means high-frequency ultrasonic waves. Therefore, it can be seen that the fish school 77 exists at a depth corresponding to the position at 4 o'clock, and that the fish school 77 exists directly beneath the ultrasonic transducer 14. At the same time, it can be seen that the scale of the fish school 77 is medium.

Further, the line segment 73 in the annular display region Z5 at the intermediate position between 4 o'clock and 5 o'clock is of a medium luminance that means a medium-intensity reflected signal and is indicated in orange that means a medium-frequency ultrasonic wave. Therefore, it can be seen in a region deeper than the depth corresponding to the 4 o'clock position that the fish school 77 exists at a position slightly away in the horizontal direction from directly beneath the ultrasonic transducer 14. At the same time, it can be seen that the scale of such a fish school 77 is almost equal to that of the fish school 77 at the depth corresponding to the 4 o'clock position.

Further, the line segment 75 in the annular display region Z5 at the 5 o'clock position is of a medium luminance that means a medium-intensity reflected signal and is indicated in yellow that means a low-frequency ultrasonic wave. Therefore, it can be seen in the region deeper than the depth corresponding to the intermediate position between 4 o'clock and 5 o'clock that the fish school 77 exists at a position horizontally away from directly beneath the ultrasonic transducer 14. At the same time, it can be seen that the scale of such a fish school 77 is almost equal to that of the fish school 77 at the depth corresponding to the position at 4 o'clock and to the intermediate position between 4 o'clock and 5 o'clock.

Figure 11A:
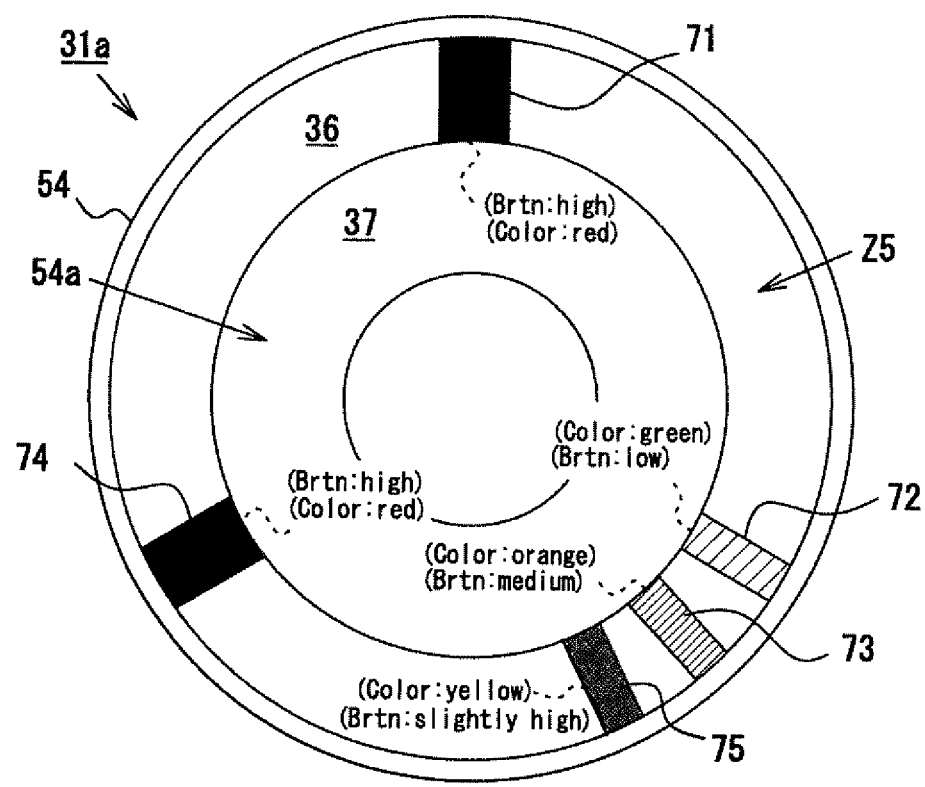
FIG. 11 (a) is the diagram showing another state of the flasher display of the flasher-type multi-frequency fish finder according to the second embodiment.
Figure 11B:
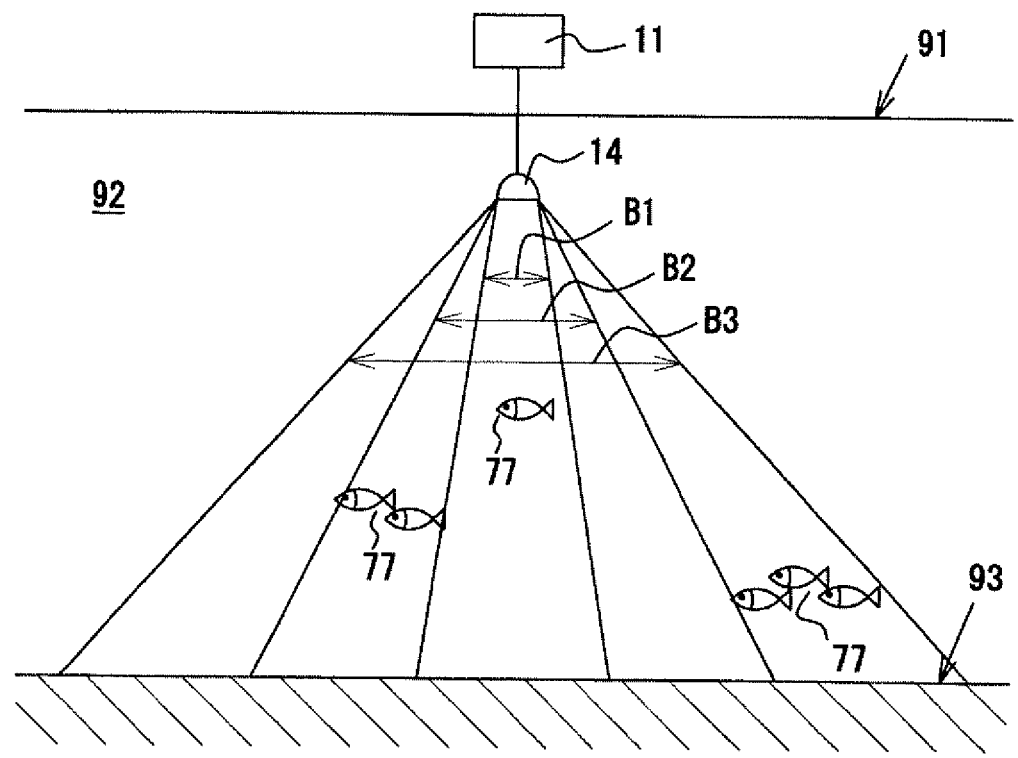

FIG. 11 (a) is a diagram showing another state of the flasher display. FIG. 11 (b) is a schematic diagram illustrating the fish school 77 while being indicated in the state of the flasher display as shown in FIG. 11 (a). As shown in FIG. 11 (a), the line segment 72 in the annular display region Z5 at the 4 o'clock position is of a low-luminance that means a low-intensity reflected signal and is indicated in green that means a high-frequency ultrasonic wave. Therefore, it can be seen that the fish school 77 exists at the depth corresponding to the position at 4 o'clock, and that such a fish school 77 exists directly beneath the ultrasonic transducer 14. At the same time, it can be seen that the scale of the fish school 77 is small.

Further, the line segment 73 in the annular display region Z5 at the intermediate position between 4 o'clock and 5 o'clock is of a medium luminance that means a medium-intensity reflected signal and is indicated in orange that means a medium-frequency ultrasonic wave. Therefore, it can be seen in the region deeper than the depth corresponding to the 4 o'clock position that the fish school 77 exists at a position slightly away in the horizontal direction from directly beneath the ultrasonic transducer 14. At the same time, it can be seen that the scale of such a fish school 77 is larger than that of the fish school 77 at the depth corresponding to the 4 o'clock position.

Further, the line segment 75 in the annular display region Z5 at the 5 o'clock position of a slightly higher luminance that means a slightly stronger reflected signal and is indicated in yellow that means a low frequency ultrasonic wave. Therefore, it can be seen in the region deeper than the depth corresponding to the intermediate position between 4 o'clock and 5 o'clock that the fish school 77 exists at a position horizontally away from directly beneath the ultrasonic transducer 14. At the same time, it can be seen that the scale of such a fish school 77 is larger than that of the fish school 77 at the depth corresponding to the position at 4 o'clock and to the intermediate position between 4 o'clock and 5 o'clock.

Incidentally, depending on the distribution state of the fish school 77 in water, the light-emission timings of the display LEDs 61 by the first, second and third light-emission signals may overlap one other. In other words, there is the case in which two or three emission signals, indicating a line segment at the same position in the annular display region Z5 on the display surface 54a, may conflict with one other. In this case, the present embodiment takes the measure to indicate preferentially the underwater-detection result obtained by using a higher frequency (in other words, an underwater-detection result obtained by using an ultrasonic beam having a narrower band is preferentially indicated).

Figure 12A:
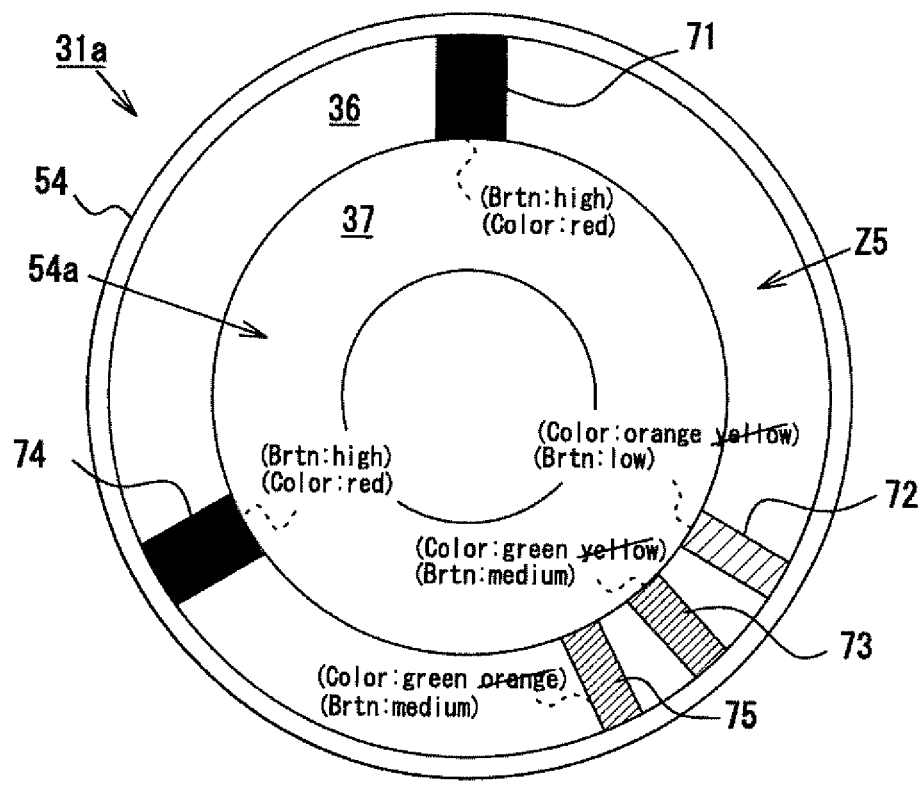
FIG. 12 (a) is the diagram showing the state of the flasher display when the signals are overlapping (or conflicting).
Figure 12B:
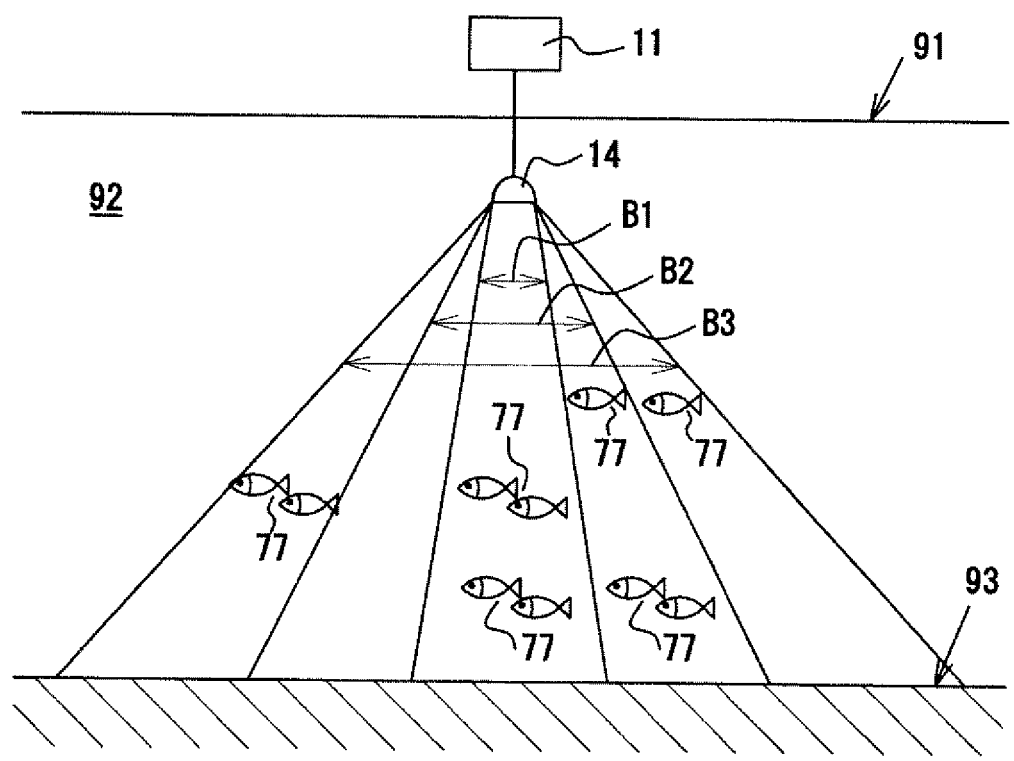

FIG. 12 (a) is the diagram showing the state of the flasher display when the signals are overlapping (or contention). FIG. 12 (b) is the schematic diagram illustrating the fish school 77 while being indicated in the state of the flasher display as shown in FIG. 12 (a).

FIG. 12 (b) shows the state in which the fish school 77 exists at a relatively shallow depth in the water. This fish school 77 is captured by a medium-frequency ultrasonic beam B2 having a medium directional angle and by a low-frequency ultrasonic beam B3 having a wide-directional angle. In this case, the light-emission timings of the display LEDs 61 by the second and third emission signals, derived from the second and third reflected signals, overlap each other. At this time, the control device 32 gives priority to the light emission by the second light-emission signal corresponding to the medium-frequency ultrasonic wave instead of to the third light-emission signal corresponding to the low-frequency ultrasonic wave. Then, the control device 32 outputs only the second light-emission signal of the overlapping second and third light-emission signals and causes the display LED 61 to emit light in orange, not in yellow, by the second light-emission signal. In FIG. 12 (a), such an overlapping (contention) occurs at the 4 o'clock position, and an orange line segment 72 is indicated there.

FIG. 12 (b) shows the state in which the fish school 77 exists at a medium depth in the water. This fish school 77 is captured by the high-frequency ultrasonic beam B1 having a narrow directional angle and by the low-frequency ultrasonic beam B3 having a wide directional angle. In this case, the light-emission timings of the display LEDs 61 by the first and third emission signals, derived from the first and third reflection signals, overlap each other. At this time, the control device 32 gives priority to the light emission by the first light-emission signal corresponding to the high-frequency ultrasonic wave instead of to the third light-emission signal corresponding to the low-frequency ultrasonic wave. Then, the control device 32 outputs only the first light-emission signal of the overlapping first and third light-emission signals and causes the display LED 61 to emit light in green, not in yellow, by the first light-emission signal. In FIG. 12 (a), such an overlapping (contention) occurs at the intermediate position between 4 o'clock and 5 o'clock, and the green-line segment 73 is indicated there.

FIG. 12 (b) shows the state in which the fish school 77 exists at a relatively deep depth. The fish school 77 is captured by the medium-frequency ultrasonic beam B2 having a medium directional angle and by the high-frequency ultrasonic beam B1 having a narrow directional angle, respectively. In this case, the light-emission timings of the display LEDs 61 by the first and second emission signals, derived from the first and second reflection signals, overlap each other. At this time, the control device 32 gives priority to the light emission by the first light-emission signal corresponding to the high frequency ultrasonic wave instead of to the second light-emission signal corresponding to the medium and low frequency ultrasonic waves. Then, the control device 32 outputs only the first light-emission signal of the overlapping first and second light emission signals and causes the display LED 61 to emit light in green, not in orange, by the first light emission signal. In FIG. 12 (a), such overlapping (contention) occurs at the 5 o'clock position, and the green-line segment 75 is indicated there.

When the light-emission timings of the display LEDs 61 by the first, second, and third emission signals overlap each other, the control device 32 gives priority to the light emission by the first emission signal corresponding to high-frequency ultrasonic waves. At this time, the control device 32 outputs only the first light-emission signal and causes the display LED 61 to emit light in green by the first light-emission signal. In this case, although not shown in FIG. 12 (a), the green-line segment is indicated at the position where the overlapping (contention) occurs.

As described above, according to the flasher type multi-frequency fish finder 11 of the second embodiment, underwater detection results by high frequency, medium frequency and low frequency ultrasonic waves are indicated in different chromatic colors in the annular display region Z5 set on the display surface 54a. In addition, the light emission signal producing part 34 performs the process of luminance modulation of the first, second and third reflected signals, respectively, so as to replace the intensity with the luminance. By this processing, the intensity of the reflected signal of each frequency (that is, the scale of the fish school) is indicated depending on the degree of the strong or weak luminance. Therefore, it is possible to indicate flashingly the underwater-detection result by three frequencies simultaneously in an easy manner to understand instinctively. In particular, according to this flasher type multi-frequency fish finder 11, it is possible to grasp accurately the scale of the fish school 77, its depth and the horizontal position of the fish school 77 in the water.

Also, the reflected signal received by the wideband ultrasonic transducer 14 is separated by the signal separating and obtaining part 33, so as to obtain the first, second and third reflected signals, and, further, to cause the light emission signal producing part 34 to produce the first, second and third light emission signals based on each reflected signal. Therefore, the ultrasonic transducer 14 and the transmission/reception circuit are not required for each frequency, thus making it possible to avoid a complex configuration, a large size, and a high cost of the device.

Also, the above embodiment of the present invention may be modified as follows.

For example, a wall-shaped light-shield body may be provided at each position to be indicated by the point P1 in FIG. 4. In this case, it is preferable that the light-shield body is formed such that the height of the display surface 54a is higher than that of the display LEDs 61a, 61b and 61c and of the character display LED 62. With such a configuration, even when the first, second, and third annular display regions Z1, Z2, and Z3 are illuminated with different colors or different intensities, such lights are less likely to be mixed with one other.

According to the above embodiment, the number of the first, second and third display LEDs 61a, 61b and 61c is set to four, respectively, but the number is not limited to this. For example, the number may be three each, or five each. Further, according to the above embodiment, the number of first, second and third display LEDs 61a, 61b and 61c is the same, but the number does not have to be the same.

According to the above embodiment, the signal separating and obtaining part 33 obtains a reflected signal of around 275 kHz, which is a high frequency; a reflected signal of around 225 kHz, which is a medium frequency; and a reflected signal of around 175 kHz, which is a low frequency. But such reflected-signal kHz measurements are not limited to these.

According to the above embodiment, a non-contact transmission method by which reflected signals and electric power are transmitted by a power-transmission coil 58 and a power-reception coil 57 is employed, but such a method is not limited to this. For example, a contact-transmission method by which transmission is done by contact between the brush and the slip ring may be employed.

According to the above embodiment, the underwater-detection result corresponding to the high frequency is indicated in the first annular-display region Z1 on the innermost peripheral side of the fish finding display part 36. On the other hand, the underwater-detection result corresponding to the low frequency is indicated in the third annular-display region Z3 on the outermost peripheral side of the fish finding display part 36. However, it is not limited to this, and such innermost and outermost peripheral sides of the display may be reversed. In other words, the underwater-detection result corresponding to the high frequency may be indicated in the third annular-display region Z3 on the outermost peripheral side of the fish finding display part 36. On the other hand, the underwater-detection result corresponding to the low frequency may be indicated in the first annular-display region Z1 on the innermost peripheral side of the fish finding display part 36.

According to the above embodiment, the signal separating and obtaining part 33 separates the reflected signal into three types of frequency components, and obtains the first reflected signal corresponding to a high frequency; the second reflected signal corresponding to a medium frequency; and the third reflected signal corresponding to a low frequency. However, it is not limited to this, and the signal separating and obtaining part 33 may separate the reflected signal into three or more types of frequency components and then also may select any three of among three or more types of frequency components, thus obtaining the first reflected signal corresponding to the high frequency; the second reflected signal corresponding to the medium frequency; and the third reflected signal corresponding to the low frequency. In other words, the frequency components may be further separated and indicated.

According to the above embodiment, an example in which the amplification rate of the received signal is not particularly adjusted is shown. However, the amplification rate of the received signal may be adjusted for the following reasons. For example, the case is considered where a target of the same size is directly beneath. In this case, it often would happen that the intensity of the received signal varies depending on the frequency. Even in the case of a wideband transducer, a decrease in sensitivity can also be seen at frequencies around at the end of the band. If the difference in sensitivity, depending on the frequency, is not corrected, the result of the frequency with high sensitivity will be emphasized, thus making it difficult to grasp accurately the underwater situation. Therefore, according to another embodiment, the amplification rate of the received signal is adjusted for each frequency, so as to cancel the difference in the sensitivity characteristic depending on the frequency.

The invention claimed is:

1. A flasher-type multi-frequency fish finder for indicating an underwater-detection result, comprising:
   a wideband ultrasonic transducer that transmits ultrasonic waves into water and receives reflected signals from that water;
   a display-rotating disk having a plurality of display LEDs on the display surface;
   a motor that rotates the display rotating disk; and
   a control device that produces a light emission signal to cause the display LED to emit light based on a reflected signal;
   with the plurality of display LEDs being arranged along the radial direction on the display surface, which include a first-display LED, a second-display LED and a third-display LED;
   with the control device including:
   a signal separating and obtaining part that separates a reflected signal into three or more types of frequency components including a first-frequency component, a second-frequency component and a third-frequency component, and obtains a first-reflected signal corresponding to the first-frequency component, a second-reflected signal corresponding to the second-frequency component and a third-reflected signal corresponding to the third-frequency component; and
   a light emission signal producing part that produces a first-light emission signal based on the first reflected signal, a second-light emission signal based on the second reflected signal, and a third-light emission signal based on the third reflected signal;
   wherein, the light emission signal producing part produces:
   the first light emission signal that causes the first-display LED to emit light;
   the second light emission signal that causes the second-display LED to emit light; and
   the third light emission signal that causes the third-display LED to emit light;
   therein, the first, second and third annular-display regions are concentrically set on the display surface, and the underwater-detection results obtained by using three different ultrasonic frequencies are simultaneously indicated by a flashing light on the first, second and third annular-display regions.

2. A flasher type multi-frequency fish finder according to claim 1, characterized in that:
   the first-display LED is arranged on the inner-peripheral side of the display rotating disk and may emit light in the first annular-display region so as to indicate the result of the first reflected signal corresponding to the frequency component on the high-frequency side among the reflected signals separated into three or more types of frequency components;
   the second-display LED is arranged on the outer-peripheral side of the first-display LED and may emit light in the second annular-display region surrounding the first annular-display region so as to indicate the result of the second reflected signal corresponding to the medium-frequency component among the reflected signals separated into three or more types of frequency components; and
   the third-display LED is arranged on the outer-peripheral side of the second-display LED and may emit light in the third annular-display region surrounding the second annular-display region so as to indicate the result of the third reflected signal corresponding to the frequency component on the low-frequency side among the reflected signals separated into three or more types of frequency components.

3. A flasher type multi-frequency fish finder according to claim 1, characterized in that the light-emission signal producing part performs luminance modulation so as to replace the intensities of the first, second and third reflected signals with luminance.

4. A flasher type multi-frequency fish finder according to claim 1, characterized in that the light-emission signal producing part performs a color modulation so as to replace the intensities of the first, second and third reflected signals with chromatic colors.

5. A flasher-type multi-frequency fish finder for indicating an underwater-detection result, comprising:
   a wideband ultrasonic transducer that transmits ultrasonic waves into water and receives reflected signals from that water;
   a display-rotating disk having a plurality of display LEDs on the display surface;
   a motor that rotates the display rotating disk; and
   a control device that produces a light emission signal to cause the display LED to emit light based on a reflected signal;
   with the control device including:
   a signal separating and obtaining part that separates a reflected signal into three or more types of frequency components including a first-frequency component, a second-frequency component and a third-frequency component, and obtains a first-reflected signal corresponding to the first-frequency component, a second-reflected signal corresponding to the second-frequency component and a third-reflected signal corresponding to the third-frequency component; and
   a light emission signal producing part that produces a first-light emission signal based on the first reflected signal, a second-light emission signal based on the second reflected signal, and a third-light emission signal based on the third reflected signal;
   wherein, the emission-signal-producing part performs:
   a luminance modulation of the first reflected signal to replace its intensity with the luminance, thus producing the first emission signal that causes the display LED to emit light in the first chromatic color;
   a luminance modulation of the second reflected signal to replace its intensity with the luminance, thus producing the second emission signal that causes the display LED to emit light in the second chromatic color different from the first chromatic color; and
   a luminance modulation of the third reflected signal to replace its intensity with the luminance, thus producing the third emission signal that causes the display LED to emit light in the third chromatic color different from the first and second chromatic colors;
   therein, an annular display region is set on the display surface, and underwater detection results, obtained by using three different types of ultrasonic frequencies, are simultaneously indicated by a flashing light in the annular display region.

6. A flasher type multifrequency fish finder according to claim 5, characterized in that when the light-emission timings of the display LEDs by the first, second and third emitting signals overlap each other, the light emission based on the result of the frequency component on the higher-frequency side is prioritized.

\* \* \* \* \*